(12) United States Patent
Krishnaswamy et al.

(10) Patent No.: US 11,902,220 B2
(45) Date of Patent: Feb. 13, 2024

(54) REPEATER METHODS AND APPARATUS

(71) Applicant: Mixcomm, Inc., Chatham, NJ (US)

(72) Inventors: Harish Krishnaswamy, New York, NY (US); Ashwin Sampath, Skillman, NJ (US); Frank Lane, Easton, PA (US)

(73) Assignee: Mixcomm, Inc., Chatham, NJ (US)

( * ) Notice: Subject to any disclaimer, the term of this patent is extended or adjusted under 35 U.S.C. 154(b) by 0 days.

(21) Appl. No.: 17/723,456

(22) Filed: Apr. 18, 2022

(65) Prior Publication Data

US 2022/0239458 A1 Jul. 28, 2022

Related U.S. Application Data

(63) Continuation of application No. 16/695,150, filed on Nov. 25, 2019, now Pat. No. 11,310,024.

(60) Provisional application No. 62/868,999, filed on Jun. 30, 2019.

(51) Int. Cl.
*H04L 5/14* (2006.01)
*H04B 7/06* (2006.01)
*H04B 7/155* (2006.01)
*H04B 1/44* (2006.01)

(52) U.S. Cl.
CPC ............ *H04L 5/1461* (2013.01); *H04B 1/44* (2013.01); *H04B 7/0617* (2013.01); *H04B 7/15507* (2013.01)

(58) Field of Classification Search
CPC ........... H04L 5/1461; H04L 5/22; H04B 1/44; H04B 7/0617; H04B 7/15507
See application file for complete search history.

(56) References Cited

U.S. PATENT DOCUMENTS

| 5,812,933 | A | * | 9/1998 | Niki ................... H04B 7/155 370/279 |
| 6,620,157 | B1 | * | 9/2003 | Dabney .............. A61B 18/1206 606/49 |
| 8,116,242 | B2 | | 2/2012 | Thomas et al. |

(Continued)

OTHER PUBLICATIONS

Michael Mao Wang et al, "Soft Decision Metric Generation for QAM With Channel Estimation Error", IEEE Transactions on Communications, IEEE Service Center, Piscataway, NJ. USA, vol. 50, No. 7, Jul. 1, 2002, pp. 1058-1061.

(Continued)

*Primary Examiner* — Brian P Cox
(74) *Attorney, Agent, or Firm* — Straub & Straub; Michael P. Straub; Stephen T. Straub

(57) ABSTRACT

Methods and apparatus for implementing a repeater are described. In various embodiments the repeater determines uplink/downlink timing information either from information broadcast from a base station or from monitoring received signals and/or gaps between received signals. In various embodiments while the repeater may decode control information to determine uplink/downlink time periods, user data is not decoded and re-encoded. In various embodiments interference between uplink and downlink circuitry is reduced or minimized by controlling gains, combining weights and/or power to amplifiers in the repeater based on the mode of operation. A stored information can include sets of different weights and/or parameters for the mode of operation and/or beam forming antenna pattern in use at a given time.

20 Claims, 12 Drawing Sheets

(56) References Cited

U.S. PATENT DOCUMENTS

| | | | | |
|---|---|---|---|---|
| 10,084,422 B1* | 9/2018 | Elzeftawi | ............. | H03G 1/0023 |
| 2005/0176368 A1* | 8/2005 | Young | ................ | H04B 7/15578 |
| | | | | 455/11.1 |
| 2008/0310651 A1* | 12/2008 | Tai | .......................... | H03F 1/305 |
| | | | | 381/94.5 |
| 2015/0327281 A1* | 11/2015 | Seo | ....................... | H04J 11/004 |
| | | | | 370/329 |
| 2018/0167958 A1* | 6/2018 | Yang | .................... | H04W 52/146 |
| 2020/0212994 A1* | 7/2020 | Ashworth | .......... | H04B 7/15542 |
| 2021/0028840 A1* | 1/2021 | Orhan | ................. | H04W 72/566 |

OTHER PUBLICATIONS

Weimin Xiao, "Optimal detection of M-QAM signal with channel estimation error", New Frontiers in Telecommunications: 2003 IEEE International Conference on Communications; ICC 2003 ; May 11-15, 2003, Anchorage, Alaska, USA; [IEEE International Conference on Communications], IEEE Operations Center, Piscataway, NJ, vol. 5, May 11, 2003, pp. 3251-3255.

Benjillali M et al, "On reliability metrics for soft-input decoding in presence of channel estimation errors", IEEE Vehicular Technology Conference, Jan. 1, 2006, pp. 2548-2552.

* cited by examiner

| Antenna Arrangement (AA) | Mode | DRW1 | DRW2 | STW1 | STW2 | DRG1 | DRG2 | STG1 | STG2 | SRW1 | SRW2 | DTW1 | DTW2 | SRG1 | SRG2 | DTG1 | DTG2 |
|---|---|---|---|---|---|---|---|---|---|---|---|---|---|---|---|---|---|
| AA 1 | UPLINK | $V1_{CE1,1}$ | $V1_{CE2,1}$ | $V1_{CE3,1}$ | $V1_{CE4,1}$ | $V1_{CE5,1}$ | $V1_{CE6,1}$ | $V1_{CE7,1}$ | $V1_{CE8,1}$ | $V1_{CE9,1}$ | $V1_{CE10,1}$ | $V1_{CE11,1}$ | $V1_{CE12,1}$ | $V1_{CE13,1}$ | $V1_{CE14,1}$ | $V1_{CE15,1}$ | $V1_{CE16,1}$ |
| AA 1 | DOWNLINK | $V2_{CE1,1}$ | $V2_{CE2,1}$ | $V2_{CE3,1}$ | $V2_{CE4,1}$ | $V2_{CE5,1}$ | $V2_{CE6,1}$ | $V2_{CE7,1}$ | $V2_{CE8,1}$ | $V2_{CE9,1}$ | $V2_{CE10,1}$ | $V2_{CE11,1}$ | $V2_{CE12,1}$ | $V2_{CE13,1}$ | $V2_{CE14,1}$ | $V2_{CE15,1}$ | $V2_{CE16,1}$ |
| AA 2 | UPLINK | $V3_{CE1,1}$ | $V3_{CE2,1}$ | $V3_{CE3,1}$ | $V3_{CE4,1}$ | $V3_{CE5,1}$ | $V3_{CE6,1}$ | $V3_{CE7,1}$ | $V3_{CE8,1}$ | $V3_{CE9,1}$ | $V3_{CE10,1}$ | $V3_{CE11,1}$ | $V3_{CE12,1}$ | $V3_{CE13,1}$ | $V3_{CE14,1}$ | $V3_{CE15,1}$ | $V3_{CE16,1}$ |
| AA 2 | DOWNLINK | $V4_{CE1,1}$ | $V4_{CE2,1}$ | $V4_{CE3,1}$ | $V4_{CE4,1}$ | $V4_{CE5,1}$ | $V4_{CE6,1}$ | $V4_{CE7,1}$ | $V4_{CE8,1}$ | $V4_{CE9,1}$ | $V4_{CE10,1}$ | $V4_{CE11,1}$ | $V4_{CE12,1}$ | $V4_{CE13,1}$ | $V4_{CE14,1}$ | $V4_{CE15,1}$ | $V4_{CE16,1}$ |
| AA 3 | UPLINK | $V5_{CE1,1}$ | $V5_{CE2,1}$ | $V5_{CE3,1}$ | $V5_{CE4,1}$ | $V5_{CE5,1}$ | $V5_{CE6,1}$ | $V5_{CE7,1}$ | $V5_{CE8,1}$ | $V5_{CE9,1}$ | $V5_{CE10,1}$ | $V5_{CE11,1}$ | $V5_{CE12,1}$ | $V5_{CE13,1}$ | $V5_{CE14,1}$ | $V5_{CE15,1}$ | $V5_{CE16,1}$ |
| AA 3 | DOWNLINK | $V6_{CE1,1}$ | $V6_{CE2,1}$ | $V6_{CE3,1}$ | $V6_{CE4,1}$ | $V6_{CE5,1}$ | $V6_{CE6,1}$ | $V6_{CE7,1}$ | $V6_{CE8,1}$ | $V6_{CE9,1}$ | $V6_{CE10,1}$ | $V6_{CE11,1}$ | $V6_{CE12,1}$ | $V6_{CE13,1}$ | $V6_{CE14,1}$ | $V6_{CE15,1}$ | $V6_{CE16,1}$ |
| ... | | | | | | | | | | | | | | | | | |
| AA X | UPLINK | $V7_{CE1,1}$ | $V7_{CE2,1}$ | $V7_{CE3,1}$ | $V7_{CE4,1}$ | $V7_{CE5,1}$ | $V7_{CE6,1}$ | $V7_{CE7,1}$ | $V7_{CE8,1}$ | $V7_{CE9,1}$ | $V7_{CE10,1}$ | $V7_{CE11,1}$ | $V7_{CE12,1}$ | $V7_{CE13,1}$ | $V7_{CE14,1}$ | $V7_{CE15,1}$ | $V7_{CE16,1}$ |
| AA X | DOWNLINK | $V8_{CE1,1}$ | $V8_{CE2,1}$ | $V8_{CE3,1}$ | $V8_{CE4,1}$ | $V8_{CE5,1}$ | $V8_{CE6,1}$ | $V8_{CE7,1}$ | $V8_{CE8,1}$ | $V8_{CE9,1}$ | $V8_{CE10,1}$ | $V8_{CE11,1}$ | $V8_{CE12,1}$ | $V8_{CE13,1}$ | $V8_{CE14,1}$ | $V8_{CE15,1}$ | $V8_{CE16,1}$ |

CODEBOOK FOR EMBODIMENT 1 — CONTROL ELEMENTS

FIGURE 4

| Antenna Arrangement (AA) | Mode | DRW1 | DRW2 | STW1 | STW2 | DRG1 | DRG2 | STG1 | STG2 | SRW1 | SRW2 | DTW1 | DTW2 | SRG1 | SRG2 | DTG1 | DTG2 |
|---|---|---|---|---|---|---|---|---|---|---|---|---|---|---|---|---|---|
| AA 1 | UPLINK | $V1_{CE1,2}$ | $V1_{CE2,2}$ | $V1_{CE3,2}$ | $V1_{CE4,2}$ | $V1_{CE5,2}$ | $V1_{CE6,2}$ | $V1_{CE7,2}$ | $V1_{CE8,2}$ | $V1_{CE9,2}$ | $V1_{CE10,2}$ | $V1_{CE11,2}$ | $V1_{CE12,2}$ | $V1_{CE13,2}$ | $V1_{CE14,2}$ | $V1_{CE15,2}$ | $V1_{CE16,2}$ |
| AA 1 | DOWNLINK | $V2_{CE1,2}$ | $V2_{CE2,2}$ | $V2_{CE3,2}$ | $V2_{CE4,2}$ | $V2_{CE5,2}$ | $V2_{CE6,2}$ | $V2_{CE7,2}$ | $V2_{CE8,2}$ | $V2_{CE9,2}$ | $V2_{CE10,2}$ | $V2_{CE11,2}$ | $V2_{CE12,2}$ | $V2_{CE13,2}$ | $V2_{CE14,2}$ | $V2_{CE15,2}$ | $V2_{CE16,2}$ |
| AA 2 | UPLINK | $V3_{CE1,2}$ | $V3_{CE2,2}$ | $V3_{CE3,2}$ | $V3_{CE4,2}$ | $V3_{CE5,2}$ | $V3_{CE6,2}$ | $V3_{CE7,2}$ | $V3_{CE8,2}$ | $V3_{CE9,2}$ | $V3_{CE10,2}$ | $V3_{CE11,2}$ | $V3_{CE12,2}$ | $V3_{CE13,2}$ | $V3_{CE14,2}$ | $V3_{CE15,2}$ | $V3_{CE16,2}$ |
| AA 2 | DOWNLINK | $V4_{CE1,2}$ | $V4_{CE2,2}$ | $V4_{CE3,2}$ | $V4_{CE4,2}$ | $V4_{CE5,2}$ | $V4_{CE6,2}$ | $V4_{CE7,2}$ | $V4_{CE8,2}$ | $V4_{CE9,2}$ | $V4_{CE10,2}$ | $V4_{CE11,2}$ | $V4_{CE12,2}$ | $V4_{CE13,2}$ | $V4_{CE14,2}$ | $V4_{CE15,2}$ | $V4_{CE16,2}$ |
| AA 3 | UPLINK | $V5_{CE1,2}$ | $V5_{CE2,2}$ | $V5_{CE3,2}$ | $V5_{CE4,2}$ | $V5_{CE5,2}$ | $V5_{CE6,2}$ | $V5_{CE7,2}$ | $V5_{CE8,2}$ | $V5_{CE9,2}$ | $V5_{CE10,2}$ | $V5_{CE11,2}$ | $V5_{CE12,2}$ | $V5_{CE13,2}$ | $V5_{CE14,2}$ | $V5_{CE15,2}$ | $V5_{CE16,2}$ |
| AA 3 | DOWNLINK | $V6_{CE1,2}$ | $V6_{CE2,2}$ | $V6_{CE3,2}$ | $V6_{CE4,2}$ | $V6_{CE5,2}$ | $V6_{CE6,2}$ | $V6_{CE7,2}$ | $V6_{CE8,2}$ | $V6_{CE9,2}$ | $V6_{CE10,2}$ | $V6_{CE11,2}$ | $V6_{CE12,2}$ | $V6_{CE13,2}$ | $V6_{CE14,2}$ | $V6_{CE15,2}$ | $V6_{CE16,2}$ |
| AA X | UPLINK | $V7_{CE1,2}$ | $V7_{CE2,2}$ | $V7_{CE3,2}$ | $V7_{CE4,2}$ | $V7_{CE5,2}$ | $V7_{CE6,2}$ | $V7_{CE7,2}$ | $V7_{CE8,2}$ | $V7_{CE9,2}$ | $V7_{CE10,2}$ | $V7_{CE11,2}$ | $V7_{CE12,2}$ | $V7_{CE13,2}$ | $V7_{CE14,2}$ | $V7_{CE15,2}$ | $V7_{CE16,2}$ |
| AA X | DOWNLINK | $V8_{CE1,2}$ | $V8_{CE2,2}$ | $V8_{CE3,2}$ | $V8_{CE4,2}$ | $V8_{CE5,2}$ | $V8_{CE6,2}$ | $V8_{CE7,2}$ | $V8_{CE8,2}$ | $V8_{CE9,2}$ | $V8_{CE10,2}$ | $V8_{CE11,2}$ | $V8_{CE12,2}$ | $V8_{CE13,2}$ | $V8_{CE14,2}$ | $V8_{CE15,2}$ | $V8_{CE16,2}$ |

FIGURE 5

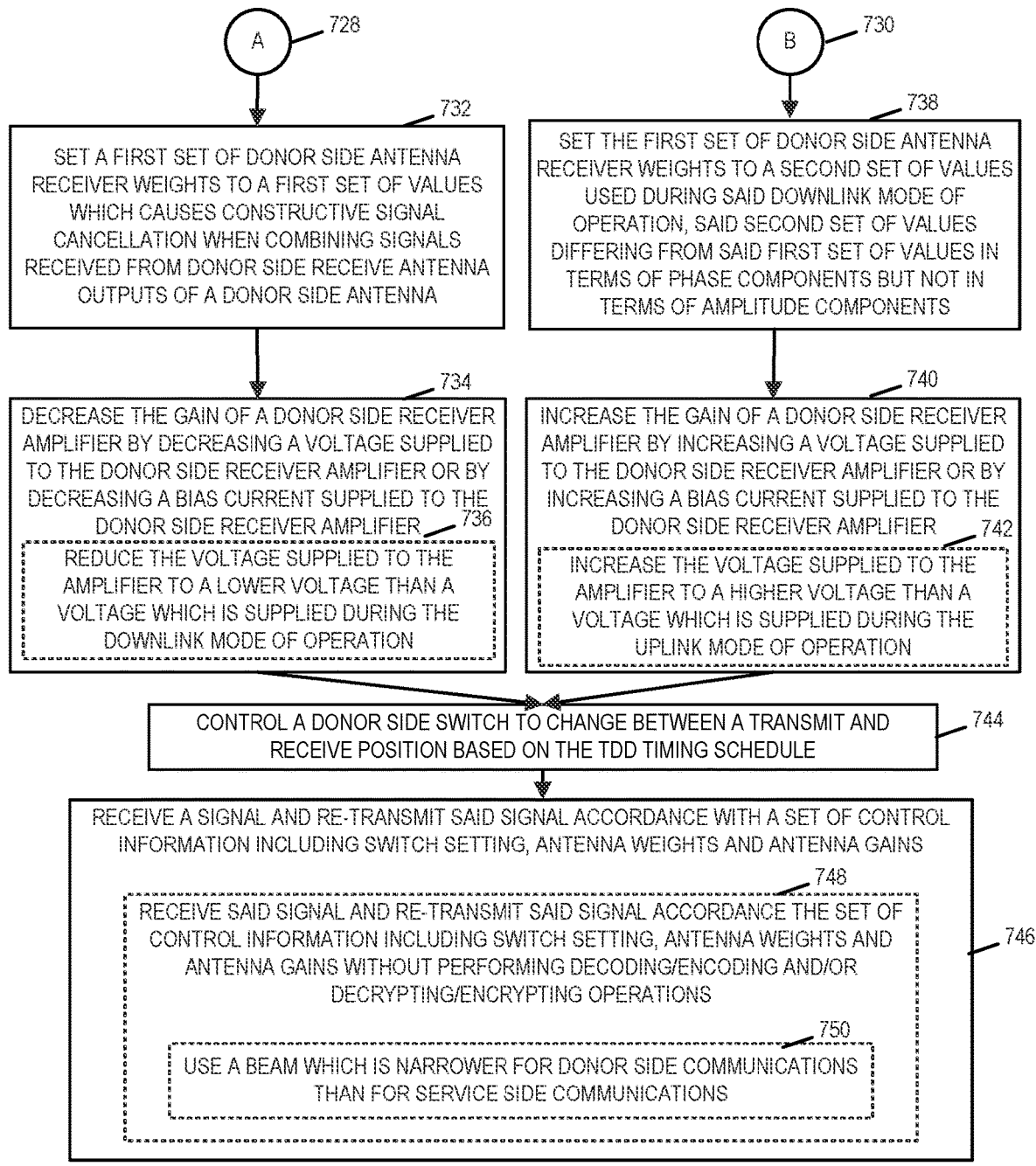

REPEATER METHODS AND APPARATUS

RELATED APPLICATIONS

The present application is a continuation of U.S. patent application Ser. No. 16/695,150 which was filed on Nov. 25, 2019, which was published as U.S. patent publication US 2020-0412519 A1 on Dec. 31, 2020, and which claims the benefit of U.S. Provisional Patent application Ser. No. 62/868,999 which was filed on Jun. 30, 2019 each of which are hereby incorporated by reference in their entirety.

FIELD

The present invention relates to wireless communications methods and apparatus, and more particularly to repeater methods and apparatus.

BACKGROUND

Fifth generation cellular wireless technologies (or 5G, for short) will rely heavily on the use of millimeter wave spectrum bands1. As is well known, these bands suffer from poorer propagation than the 'traditional' cellular bands which are typically below 3 GHz (or 10 cm in wavelength). Furthermore, depending on the band, they could suffer from additional losses due to absorption from the atmosphere (e.g. due to water vapor, oxygen etc.). Human bodies, being mostly comprised of water, shadow the millimeter wave signal drastically. Also, diffraction (a mode of propagation where the signal bends on an edge that it encounters) results in a much greater loss as the wavelengths get shorter. Taken together, this implies that in millimeter wave bands, the cell radii will be on the order of 100-200 meters and furthermore will require line-of-sight (LOS) or strong specular reflections to sustain links.

The core technology used to address these propagation limitations is beamforming, wherein many antenna elements are used at the base station (called gNB in the 5G context) and the user equipment (UE), to allow constructive addition of their signals in space, in the direction of interest. The net effect is the amplitude sum of the signals from each antenna in the direction of interest and thereby a concentration of the electromagnetic radiation, i.e. a beam. If the user moves or something in the environment changes, a 'new' beam has to be found between the transmitter and the receiver. This is shown in FIG. 1. Thus, beamforming would generally have to be done on a per UE basis with associated measurement and control mechanisms to change the beam as needed.

Despite having such dynamic beamforming mechanisms, in some situations it will be virtually impossible to get coverage. Consider for example if a user is walking down a Manhattan street/avenue environment, if a user takes a turn from a street to an avenue, he/she could go from an excellent, line-of-sight (LOS) link to having no link at all. One could certainly densify the network by adding more and more gNBs to overcome these problems but that entails a substantial cost and network management penalty for operators.

Repeaters and/or relays are used to sometimes enhance the coverage area of a transmitting device. The term 'repeaters' is generally used when the 'box' doesn't attempt to decode the signal, but simply receives an RF signal over the air, amplifies it and re-transmits it. The term 'relays' is generally used when the box receives the RF signal, typically down converts from RF to baseband to do some digital processing up to and including a full decode of the bits, followed by re-encoding of the bits and up conversion back to RF prior to transmission. While the above is a general use of terminology in the art, the partition between what is a repeater and what is a relay is not strict. Repeaters can also be fully in-band wherein the receive frequency and the transmit frequency are the same (often called f1/f1 repeaters) or they can be out-of-band (often called f1/f2 repeaters), wherein the receive frequency and transmit frequency are different.

Relays suffer from having to fully decode the bits of a received signal before retransmitting. This suffers not only from the problem of cost as the decoding circuitry can add cost to a device but also from the delay associated with decoding and then re-encoding data prior to transmission. In highly dynamic environments such delays can be undesirable.

Repeaters and relays are not a new concept but in the case of beam forming systems where devices are subject to power transmission constraints face several implementation problems relating to the need for taking into consideration the timing of transmissions and/or beams being used by the source of a signal to be retransmitted, the transmission power constraints imposed upon a repeater, and the potential interference that can be caused by retransmission and/or the delays associated with retransmission of a signal. Furthermore, in the case of a repeater that is to support communications in multiple directions, e.g., uplink and downlink, there feedback from a signal being relayed in one direction may leak and be fully or partially retransmitted in the other direction.

For a variety of reasons, it is desirable to be able to implement a device which could rely transmissions in a dynamic environment where switching between uplink and downlink transmission occur without the need to fully decode traffic data being retransmitted, e.g., relayed. It would be desirable if the device operating as a relay need not appear and be recognized by the original transmitting device, e.g., base station or user equipment device, as a separate entity from the device to which the signal or signals is being relayed. In addition it would be desirable if, in at least some but not necessarily all embodiments, beam forming could be supported by a relay device on at least one, but possibly both, side of a relay device, e.g., a side facing client devices or a side facing a base station or access point.

SUMMARY

Various features relate to methods and apparatus for implementing repeater devices. In some embodiments the repeater devices can decode control and/or signaling information but normally does not re-encode data prior to retransmission. In various embodiments timing and/or other control information is based on received signals. The timing and control information is derived from received signals without the need to decode traffic data, e.g., text, voice or other data being communicated between a base station, sometimes referred to as an access point, and a user equipment (UE) device with in some cases the repeater of the invention located between the base station and UE device and the UE device sometimes simply being referred to as a UE.

Timing and/or frequency related control information maybe and sometimes is examined, e.g., decoded, and used to facilitate control of repeater operation, e.g., switching between a repeater downlink mode of operation in which signals from a base station are communicated to one or more UE devices, and a repeater uplink mode of operation in which signals are communicated to an access point from one or more UE devices. This may and in some but not necessarily all embodiments does include receiving and decoding SIB (system information broadcast) or SFI (slot format indication) broadcast to recover TDD timing information. Such decoding allows for the use of a relatively simple decoder that is capable of decoding broadcast control but without decoding traffic data being transmitted as part of the repeater operation. In other embodiments an uplink and/or downlink schedule is received by the repeater from a base station or other device via a communications channel, sometimes referred to as a side channel. The side channel maybe and sometimes is a wireless communications channel which is not used for communicating data to a UE.

Based on received signals, e.g., broadcast information, the repeater is able to determine when should operate in an uplink or downlink mode of operation. Switching of one or more transmit/receive switches is based on the when the repeater device is determined to switch between uplink and downlink modes of operation.

During individual modes of operation switch positions, gains, phases of signals being combined and/or power to amplifiers in the uplink or downlink signal paths are controlled to reduce or minimize interference from the signal path that is not to be used during the particular uplink or downlink mode of operation.

In some embodiments lookup tables containing sets of control information are accessed and used to control the components in the repeater depending on the mode of operation and/or the antenna configuration to be used at a given time. While gain of various applying components, phase of signals being combined and/or power to a particular device may and sometimes are all controlled in other embodiments one or two of these are controlled based on the mode of operation being implemented at a given time. For example, in some embodiments power to an amplifier is maintained regardless of the mode of operation to avoid transients due to power changes with phase of signals and/or gain of an amplifier being controlled to minimize interference between the uplink and downlink signal paths. In other embodiments simply phase of signals is controlled to reduce or minimize interference between the uplink and downlink signal paths.

While information which can be used to determine uplink/downlink scheduling is decoded and used in some embodiments to control whether a device operates in uplink or downlink modes of operation in other embodiments power of received signals is used to infer whether devices are operating in uplink or downlink mode of operation and the schedule of such modes of operation. Thus, while broadcast control/scheduling is decoded and used in some embodiments other embodiments do not need or rely on the decoding of broadcast or scheduling information.

While control/scheduling is decoded in some embodiments, such information is usually sent out prior to data transmissions. Thus, while a decoder is used to decode control/scheduling information in some embodiments the decoder need not and does not decode data transmission to particular devices and furthermore there is no need for an encoder to re-encode decoded data since, in at least some embodiments, the repeater does not re-encode decoded data for transmission to other devices. Thus, in some, but not necessarily all embodiments, the repeater of the invention lacks, i.e., does not include, an encoder or re-encoder.

The methods and apparatus can be used with devices which support the use of different antenna patterns at different times and is well suited for outdoor applications where the repeater maybe and sometimes is mounted on a pole such as a telephone pole or traffic light poll at an intersection. Through the use of repeaters, transmission range can be extended around building and corners of intersections in a cost effective and easy to implement manner that is relatively transparent to the user devices and access points in the system.

Because of the small delay associated with the retransmission of signals by a repeater implemented in accordance with the invention, signals received by UE devices and/or access points can be combined with the signals received directly from the original transmitting device and decoded, e.g., as if they were the result of a multipath transmission from the original transmitting device.

Some features are directed to a method of operating a repeater comprising detecting a time division duplex (TDD) timing schedule including a plurality of times at which a switch is made between uplink and downlink communication; and controlling a donor side switch (T/R switch) to change between a transmit position and a receive position based on the TDD timing schedule. In various embodiments the detecting of the uplink/downlink schedule is performed without re-encoding of data or signals being communicated, e.g. repeated or relayed.

Other features are related to a repeater including a process configured to control the repeater to detect a time division duplex (TDD) timing schedule including a plurality of times at which a switch is made between uplink and downlink communication; and controlling a donor side switch (T/R switch) to change between a transmit position and a receive position based on the TDD timing schedule.

While various features and methods have been described, all embodiments need not include all features or steps mentioned in the summary. Numerous additional features and embodiments are discussed in the detailed description which follows.

BRIEF DESCRIPTION OF THE FIGURES

FIG. 4 is a drawing of an exemplary first codebook, e.g., for an embodiment corresponding to the circuit design of the antenna array assembly shown in FIG. 2.

FIG. 5 is a drawing of an exemplary second codebook, e.g., an embodiment corresponding to the circuit design if the antenna array assembly shown in FIG. 3.

FIG. 7B is a second part of a flowchart of an exemplary method of operating a repeater, e.g., the repeater of FIG. 6, in accordance with an exemplary embodiment.

FIG. 7, comprises the combination of FIG. 7A and FIG. 7B.

DETAILED DESCRIPTION

Figure 1:
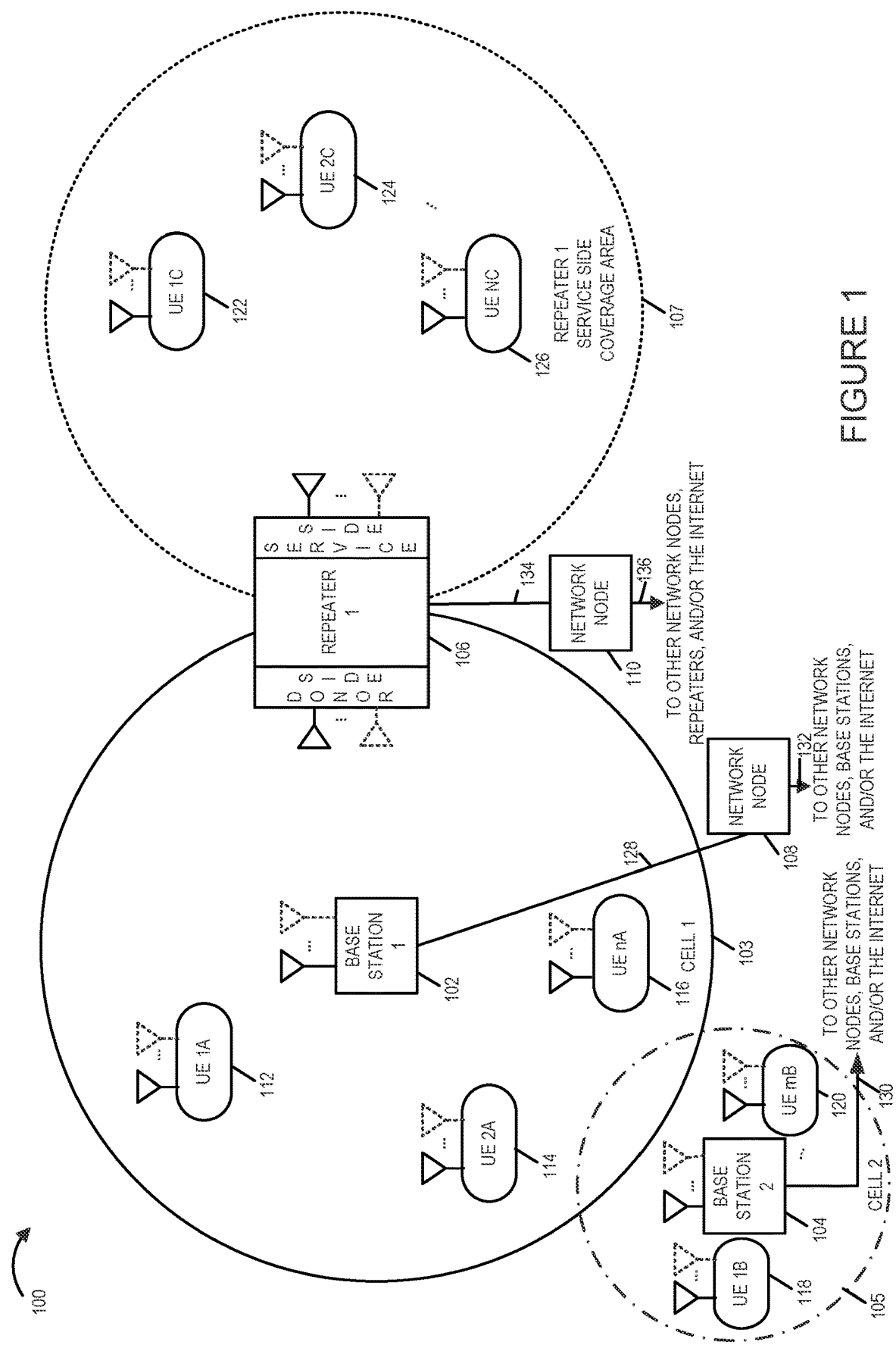
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a base station 1 (BS 1) 102, base station 2 104, repeater 1 106, network node 108, and network node 110 coupled together as shown in FIG. 1. Base station 1 102 has a corresponding wireless coverage area 103. Base station 2 104 has a corresponding wireless coverage area 105. Repeater 1 106 has a corresponding service side wireless coverage area 107. The exemplary communications system 100 further includes a plurality of user equipment (UE) devices. At least some of the UEs are mobile devices which may move throughout the system 100. As shown in FIG. 1, a plurality of UEs (UE 1A 112, UE 2A 114, . . . , UE N1 116) are currently located within wireless coverage area 103 and may, and sometimes do: i) receive downlink wireless signals from BS 1 102 and ii) transmit uplink wireless signals to BS 1 102. As shown in FIG. 1, a plurality of UEs (UE 1B 118, . . . , UE mB 120) are currently located within wireless coverage area 105 and may, and sometimes do: i) receive downlink wireless signals from BS 2 104 and ii) transmit uplink wireless signals to BS 2 104. As shown in FIG. 1, a plurality of UEs (UE 1C 122, UE 2C 124, . . . , UE NC 126) are currently located within the repeater 1 service side wireless coverage area 107 and may, and sometimes do: i) receive downlink wireless signals from repeater 1 106 and ii) transmit uplink wireless signals to repeater 1 106.

Base station 1 102 is coupled to network node 108 via communications link 128. Network node 108 is coupled to other network nodes, other base stations and/or the Internet via communications link 132. Base station 2 104 is coupled to other network nodes, other base stations and/or the Internet via communications link 130. Repeater 1 106 is coupled to network node 110 via communications link 134. Network node 110 is coupled to other network nodes, other repeaters and/or the Internet via communications link 136.

Repeater 1 106 includes a donor side including one or more donor antennas for communicating with base station 1 102. Repeater 1 106 includes a service including one or more donor antennas for communicating with user equipment (UE) devices with the repeater 1 service side coverage area 107. Repeater 1 106 acts as an intermediary device between base station 1 102 and UE devices, which are located within repeater 1 service side coverage area 107. In some embodiments, repeater 1 106 is strategically located and used to provide coverage to an area which normally has no or poor reception with regard to wireless signals from base station 1, e.g., due to obstacles in the path, e.g., a mountain, a building, etc.

Figure 2:
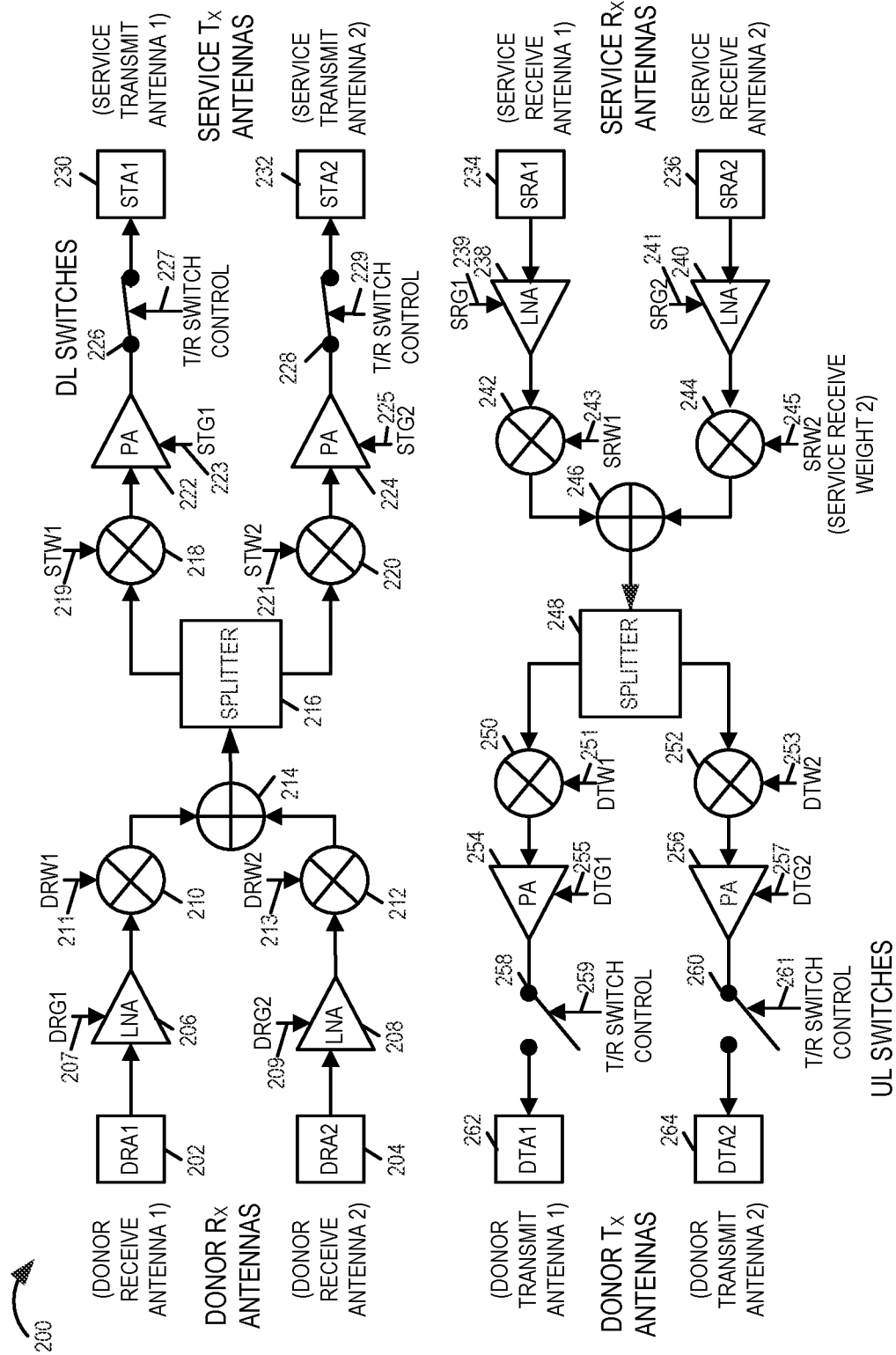
FIG. 2 is a drawing of an exemplary circuit design implementation of an antenna array assembly which may be included in a repeater in accordance with an exemplary embodiment.

FIG. 2 is a drawing of an exemplary circuit design implementation of an antenna array assembly 200 which may be included in a repeater in accordance with an exemplary embodiment. The exemplary circuit design implementation of FIG. 2 uses switches and weights to null the self-interference for the case of separate Transmit (Tx) and Receive (Rx) arrays. The exemplary circuit design implementation of FIG. 2 includes a donor receive antenna 1 (DRA1) 202, donor receive antenna 2 (DRA2) 204, low noise amplifier (LNA) 206, LNA 208, signal mixer 210, signal mixer 212, combiner 214, splitter 216, signal mixer 218, signal mixer 220, power amplifier (PA) 222, PA 224, downlink (DL) Transmit/Receive (T/R) switch 226, DL T/R switch 228, service transmit antenna 1 (STA1) 230 and service transmit antenna 2 (STA 2) 232.

The output of DRA 1 202 is coupled to the input of LNA 206. LNA 206 is controlled via a control gain signal received on donor receive gain 1(DRG1) control line 207. The output of LNA 206 is input to mixer 210, which is mixed with a control weight signal received on donor received weight 1(DRW1) control line 211. The output of the mixer 210 is a first input to signal combiner 214.

The output of DRA 2 204 is coupled to the input of LNA 208. LNA 208 is controlled via a control gain signal received on donor receive gain 2(DRG2) control line 209. The output of LNA 208 is input to mixer 212, which is mixed with a control weight signal received on donor received weight 2(DRW2) control line 213. The output of the mixer 212 is a second input to signal combiner 214.

The output of combiner 214 is coupled to the input of splitter 216. A first output of splitter 216 is coupled to a first input of mixer 218. A second input to mixer 218 is a control weight signal received on service transmit weight 1 (STW1) control line 219. The output of mixer 218 is coupled to the input of PA 222. PA 222 is controlled via a control gain signal received on service transmit gain 1(STG1) control line 223. The output of PA 222 is coupled to an input of T/R switch 226, which is a DL switch. T/R switch 226 is controlled to be closed or open based on the signal received on DL switch control line 227. The output of switch 226 is coupled to the input of service transmit antenna 1 (STA1) 230.

A second output of splitter 216 is coupled to a first input of mixer 220. A second input to mixer 220 is a control weight signal received on service transmit weight 2 (STW2) control line 221. The output of mixer 220 is coupled to the input of PA 224. PA 224 is controlled via a control gain signal received on service transmit gain 2 (STG2) control line 225. The output of PA 225 is coupled to an input of T/R switch 228, which is a DL switch. T/R switch 228 is controlled to be closed or open based on the signal received on DL switch control line 229. The output of switch 228 is coupled to the input of service transmit antenna 2 (STA2) 232.

The exemplary circuit design implementation of FIG. 2 further includes a service receive antenna 1 (SRA1) 234, service receive antenna 2 (SRA2) 236, low noise amplifier (LNA) 238, LNA 240, signal mixer 242, signal mixer 244, combiner 246, splitter 248, signal mixer 250, signal mixer 252, power amplifier (PA) 254, PA 256, Uplink (UL) Transmit/Receive (T/R) switch 258, UL T/R switch 260, donor transmit antenna 1 (DTA1) 262 and donor transmit antenna 2 (DTA 2) 264.

The output of SRA 1 234 is coupled to the input of LNA 238. LNA 238 is controlled via a control gain signal received on service receive gain 1(SRG1) control line 239. The output of LNA 238 is input to mixer 242, which is mixed with a control weight signal received on service receive weight 1(SRW1) control line 243. The output of the mixer 242 is a first input to signal combiner 246.

The output of SRA 2 236 is coupled to the input of LNA 240. LNA 240 is controlled via a control gain signal received on service receive gain 2 (SRG2) control line 241. The output of LNA 240 is input to mixer 244, which is mixed with a control weight signal received on service received weight 2 (SRW2) control line 245. The output of the mixer 244 is a second input to signal combiner 246.

The output of combiner 246 is coupled to the input of splitter 248. A first output of splitter 248 is coupled to a first input of mixer 250. A second input to mixer 250 is a control weight signal received on donor transmit weight 1 (DTW1) control line 251. The output of mixer 240 is coupled to the input of PA 254. PA 254 is controlled via a control gain signal received on donor transmit gain 1 (DTG1) control line 255. The output of PA 254 is coupled to an input of T/R switch 258, which is a UL switch. T/R switch 258 is controlled to be closed or open based on the signal received on UL switch control line 259. The output of switch 258 is coupled to the input of donor transmit antenna 1 (DTA1) 262.

A second output of splitter 248 is coupled to a first input of mixer 252. A second input to mixer 252 is a control weight signal received on donor transmit weight 2 (DTW2) control line 253. The output of mixer 252 is coupled to the input of PA 256. PA 256 is controlled via a control gain signal received on donor transmit gain 2 (DTG2) control line 257. The output of PA 256 is coupled to an input of T/R switch 260, which is a UL switch. T/R switch 260 is controlled to be closed or open based on the signal received on UL switch control line 261. The output of switch 260 is coupled to the input of donor transmit antenna 2 (DTA2) 264.

Figure 3:
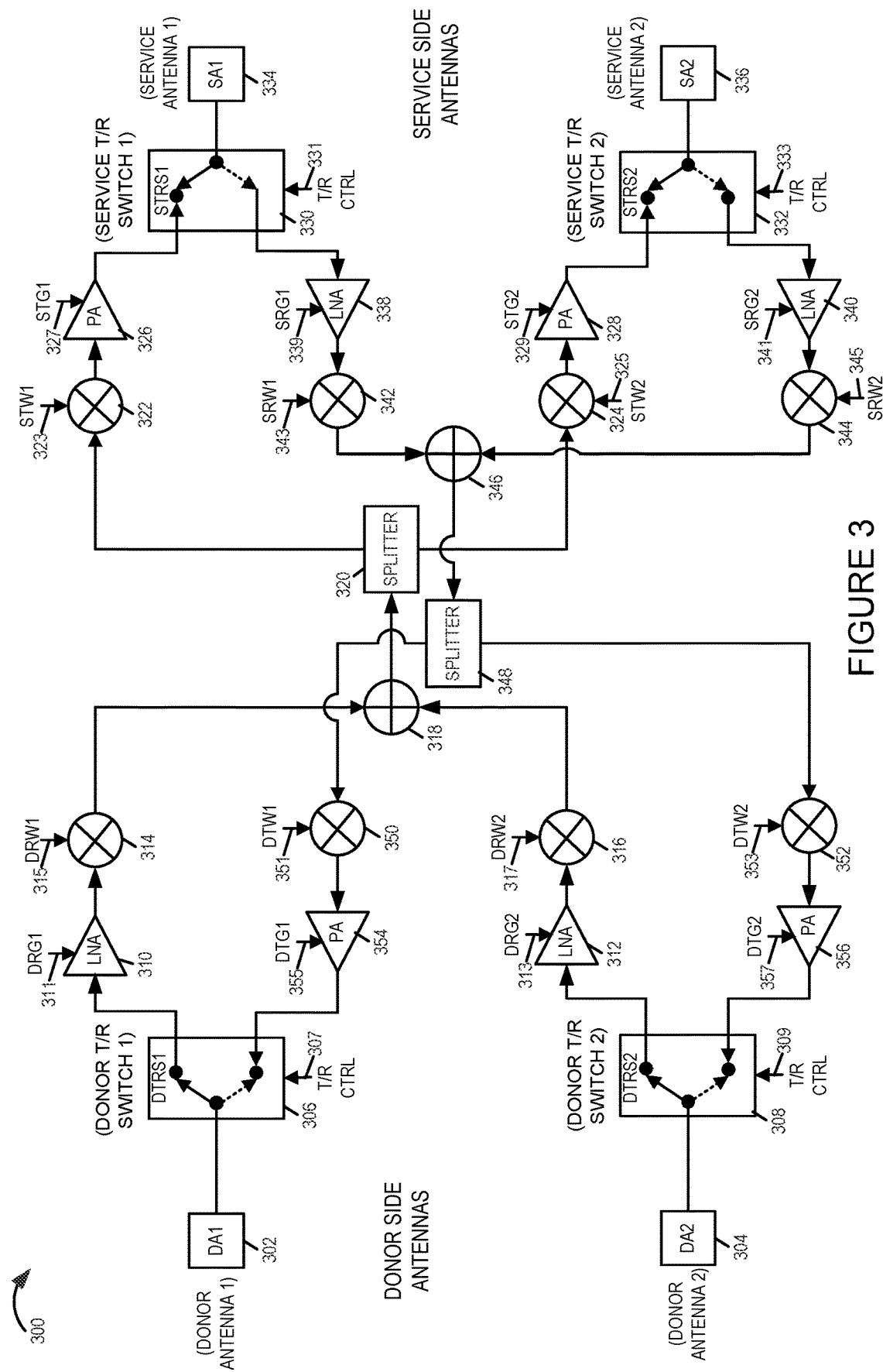
FIG. 3 is a drawing of another exemplary circuit design implementation of an antenna array assembly which may be included in a repeater in accordance with an exemplary embodiment.

FIG. 3 is a drawing of an exemplary circuit design implementation of an antenna array assembly 300 which may be included in a repeater in accordance with an exemplary embodiment. The exemplary circuit design implementation of FIG. 3 uses switches and weights to null the self-interference for the case of common Transmit (Tx) and Receive (Rx) arrays. The exemplary circuit design implementation of FIG. 3 includes a donor antenna 1 (DA1) 302, donor antenna 2 (DA2) 304, donor T/R switch 1 (DTRS1) 306, donor T/R switch 2 (DTRS2) 308, low noise amplifier (LNA) 310, LNA 312, signal mixer 314, signal mixer 316, combiner 318, splitter 320, signal mixer 322, signal mixer 324, power amplifier (PA) 326, PA 328, Service Transmit/Receive (T/R) switch 1 (STRS1) 330, STRS2 332, service antenna 1 (SA1) 334 and service antenna 2 (SA2) 336.

DA1 302 is coupled to DTRS1 306. The position of DTRS1 306 is controlled based on the T/R receive control signal received on T/R control line 307. When DA1 302 is to be used as a receive antenna DTRS1 306 is controlled to couple the DA1 302 to the input of LNA 310, thus routing a received signal from DA1 302 to an input of LNA 310. LNA 310 is controlled via a control gain signal received on donor receive gain 1 (DRG1) control line 311. The output of LNA 310 is input to mixer 314, which is mixed with a control weight signal received on donor receive weight 1 (DRW1) control line 315. The output of the mixer 314 is a first input to signal combiner 318.

DA2 304 is coupled to DTRS2 308. The position of DTRS2 308 is controlled based on the T/R receive control signal received on T/R control line 309. When DA2 304 is to be used as a receive antenna DTRS2 308 is controlled to couple the DA2 304 to the input of LNA 312, thus routing a received signal from DA2 304 to an input of LNA 312. LNA 312 is controlled via a control gain signal received on donor receive gain 1 (DRG2) control line 313. The output of LNA 312 is input to mixer 316, which is mixed with a control weight signal received on donor receive weight 2 (DRW2) control line 317. The output of the mixer 316 is a second input to signal combiner 318.

The output of combiner 318 is coupled to the input of splitter 320. A first output of splitter 320 is coupled to a first input of mixer 322. A second input to mixer 322 is a control weight signal received on service transmit weight 1 (STW1) control line 323. The output of mixer 322 is coupled to the input of PA 326. PA 326 is controlled via a control gain signal received on service transmit gain 1(STG1) control line 327. The output of PA 326 is coupled to service T/R switch 1 (STRS1) 330. The position of STRS1 330 is controlled based on the T/R receive control signal received on T/R control line 331. When SA1 334 is to be used as a transmit antenna STRS1 330 is controlled to couple the output of PA 326 to SA1 334, thus routing a generated transmit signal from PA 326 to SA1 334.

A second output of splitter 320 is coupled to a first input of mixer 324. A second input to mixer 324 is a control weight signal received on service transmit weight 2 (STW2) control line 325. The output of mixer 324 is coupled to the input of PA 328. PA 328 is controlled via a control gain signal received on service transmit gain 2 (STG2) control line 329. The output of PA 328 is coupled to service T/R switch 2 (STRS2) 332. The position of STRS2 332 is controlled based on the T/R receive control signal received on T/R control line 333. When SA2 336 is to be used as a transmit antenna STRS2 332 is controlled to couple the output of PA 328 to SA2 336, thus routing a generated transmit signal from PA 328 to SA2 336.

The exemplary circuit design implementation of FIG. 3 includes low noise amplifier (LNA) 338, LNA 340, signal mixer 342, signal mixer 344, combiner 346, splitter 348, signal mixer 350, signal mixer 352, and power amplifier (PA) 354.

SA1 3334 is coupled to STRS1 330. The position of STRS1 330 is controlled based on the T/R receive control signal received on T/R control line 331. When SA1 302 is to be used as a receive antenna STRS1 330 is controlled to couple the SA1 334 to the input of LNA 3338, thus routing a received signal from SA1 334 to an input of LNA 3338. LNA 338 is controlled via a control gain signal received on service receive gain 1 (SRG1) control line 339. The output of LNA 338 is input to mixer 342, which is mixed with a control weight signal received on service receive weight 1 (SRW1) control line 343. The output of the mixer 342 is a first input to signal combiner 346.

SA2 336 is coupled to STRS2 332. The position of STRS2 332 is controlled based on the T/R receive control signal received on T/R control line 333. When SA2 336 is to be used as a receive antenna STRS2 332 is controlled to couple the SA2 336 to the input of LNA 340, thus routing a received signal from SA2 336 to an input of LNA 340. LNA 340 is controlled via a control gain signal received on service receive gain 2 (SRG2) control line 341. The output of LNA 340 is input to mixer 344, which is mixed with a control weight signal received on service receive weight 2

(SRW2) control line 345. The output of the mixer 344 is a second input to signal combiner 346.

The output of combiner 346 is coupled to the input of splitter 348. A first output of splitter 348 is coupled to a first input of mixer 350. A second input to mixer 350 is a control weight signal received on donor transmit weight 1 (DTW1) control line 351. The output of mixer 350 is coupled to the input of PA 354. PA 354 is controlled via a control gain signal received on donor transmit gain 1 (DTG1) control line 355. The output of PA 354 is coupled to donor T/R switch 1 (DTRS1) 306. The position of DTRS1 306 is controlled based on the T/R receive control signal received on T/R control line 307. When DA1 302 is to be used as a transmit antenna DTRS1 3306 is controlled to couple the output of PA 354 to DA1 302, thus routing a generated transmit signal from PA 354 to DA1 302.

A second output of splitter 348 is coupled to a first input of mixer 353. A second input to mixer 352 is a control weight signal received on donor transmit weight 2 (DTW2) control line 353. The output of mixer 352 is coupled to the input of PA 356. PA 356 is controlled via a control gain signal received on donor transmit gain 2 (DTG2) control line 357. The output of PA 356 is coupled to donor T/R switch 2 (DTRS2) 308. The position of DTRS2 308 is controlled based on the T/R receive control signal received on T/R control line 309. When DA2 304 is to be used as a transmit antenna DTRS2 308 is controlled to couple the output of PA 356 to DA2 304, thus routing a generated transmit signal from PA 3356 to DA2 304.

FIG. 4 is a drawing of an exemplary codebook for an exemplary embodiment 1, e.g., an embodiment corresponding to the circuit design shown in FIG. 2. First column 402 includes antenna arrangement information. Second column 404 includes mode information. Third column 406 includes values for the donor receive weight 1 (DRW1) control element corresponding to different antenna arrangements. Fourth column 408 includes values for the donor receive weight 2 (DRW2) control element corresponding to different antenna arrangements. Fifth column 410 includes values for the service transmit weight 1 (STW1) control element corresponding to different antenna arrangements. Sixth column 412 includes values for the service transmit weight 2 (STW2) control element corresponding to different antenna arrangements. Seventh column 414 includes values for the donor receive gain 1 (DRG1) control element corresponding to different antenna arrangements. Eighth column 416 includes values for the donor receive gain 2 (DRG2) control element corresponding to different antenna arrangements. Ninth column 418 includes values for the service transmit gain 1 (STG1) control element corresponding to different antenna arrangements. Tenth column 420 includes values for the service transmit gain 2 (STG2) control element corresponding to different antenna arrangements. Eleventh column 422 includes values for the service receive weight 1 (SRW1) control element corresponding to different antenna arrangements. Twelfth column 424 includes values for the service receive weight 2 (SRW2) control element corresponding to different antenna arrangements. Thirteenth column 426 includes values for the donor transmit weight 1 (DTW1) control element corresponding to different antenna arrangements. Fourteenth column 428 includes values for the donor transmit weight 2 (DTW2) control element corresponding to different antenna arrangements. Fifteenth column 430 includes values for the service receive gain 1 (SRG1) control element corresponding to different antenna arrangements. Sixteenth column 432 includes values for the service receive gain 2 (SRG2) control element corresponding to different antenna arrangements. Seventeenth column 434 includes values for the donor transmit gain 1 (DTG1) control element corresponding to different antenna arrangements. Eighteenth column 436 includes values for the donor transmit gain 2 (DTG2) control element corresponding to different antenna arrangements.

First row 438 includes information identifying the codebook 400 as corresponding to exemplary embodiment 1. Second row 440 includes column header information: i) identifying that the first column 402 includes antenna arrangement (AA) information, ii) identifying the second column 404 includes mode information, and iii) identifying that third column 406 through eighteenth column 436 includes control element information. Third row 442 includes column header information identifying a particular control element for each of the third column 406 through eighteenth column 436.

Fourth row 444 includes values for each of the control elements corresponding to antenna arrangement 1 (AA1) and uplink mode. Fifth row 446 includes values for each of the control elements corresponding to antenna arrangement 1 (AA1) and downlink mode. Sixth row 448 includes values for each of the control elements corresponding to antenna arrangement 2 (AA2) and uplink mode. Seventh row 450 includes values for each of the control elements corresponding to antenna arrangement 2 (AA2) and downlink mode. Eighth row 452 includes values for each of the control elements corresponding to antenna arrangement 3 (AA3) and uplink mode. Ninth row 454 includes values for each of the control elements corresponding to antenna arrangement 3 (AA3) and downlink mode. Tenth row 456 includes values for each of the control elements corresponding to antenna arrangement X (AAX) and uplink mode. Eleventh row 458 includes values for each of the control elements corresponding to antenna arrangement X (AAX) and downlink mode.

FIG. 5 is a drawing of an exemplary codebook for an exemplary embodiment 2, e.g., an embodiment corresponding to the circuit design shown in FIG. 3. First column 502 includes antenna arrangement information. Second column 504 includes mode information. Third column 506 includes values for the donor receive weight 1 (DRW1) control element corresponding to different antenna arrangements. Fourth column 508 includes values for the donor receive weight 2 (DRW2) control element corresponding to different antenna arrangements. Fifth column 510 includes values for the service transmit weight 1 (STW1) control element corresponding to different antenna arrangements. Sixth column 512 includes values for the service transmit weight 2 (STW2) control element corresponding to different antenna arrangements. Seventh column 514 includes values for the donor receive gain 1 (DRG1) control element corresponding to different antenna arrangements. Eighth column 516 includes values for the donor receive gain 2 (DRG2) control element corresponding to different antenna arrangements. Ninth column 518 includes values for the service transmit gain 1 (STG1) control element corresponding to different antenna arrangements. Tenth column 520 includes values for the service transmit gain 2 (STG2) control element corresponding to different antenna arrangements. Eleventh column 522 includes values for the service receive weight 1 (SRW1) control element corresponding to different antenna arrangements. Twelfth column 524 includes values for the service receive weight 2 (SRW2) control element corresponding to different antenna arrangements. Thirteenth column 526 includes values for the donor transmit weight 1 (DTW1) control element corresponding to different antenna arrangements. Fourteenth column 528 includes values for the donor transmit weight 2 (DTW2) control element corresponding to different antenna arrangements. Fifteenth column 530 includes values for the service receive gain 1 (SRG1) control element corresponding to different antenna arrangements. Sixteenth column 532 includes values for the service receive gain 2 (SRG2) control element corresponding to different antenna arrangements. Seventeenth column 534 includes values for the donor transmit gain 1 (DTG1) control element corresponding to different antenna arrangements. Eighteenth column 536 includes values for the donor transmit gain 2 (DTG2) control element corresponding to different antenna arrangements.

First row 538 includes information identifying the codebook 400 as corresponding to exemplary embodiment 1. Second row 540 includes column header information: i) identifying that the first column 502 includes antenna arrangement (AA) information, ii) identifying the second column 504 includes mode information, and iii) identifying that third column 506 through eighteenth column 536 includes control element information. Third row 542 includes column header information identifying a particular control element for each of the third column 506 through eighteenth column 536.

Fourth row 544 includes values for each of the control elements corresponding to antenna arrangement 1 (AA1) and uplink mode. Fifth row 546 includes values for each of the control elements corresponding to antenna arrangement 1 (AA1) and downlink mode. Sixth row 548 includes values for each of the control elements corresponding to antenna arrangement 2 (AA2) and uplink mode. Seventh row 550 includes values for each of the control elements corresponding to antenna arrangement 2 (AA2) and downlink mode. Eighth row 552 includes values for each of the control elements corresponding to antenna arrangement 3 (AA3) and uplink mode. Ninth row 554 includes values for each of the control elements corresponding to antenna arrangement 3 (AA3) and downlink mode. Tenth row 556 includes values for each of the control elements corresponding to antenna arrangement X (AAX) and uplink mode. Eleventh row 558 includes values for each of the control elements corresponding to antenna arrangement X (AAX) and downlink mode.

Figure 6:
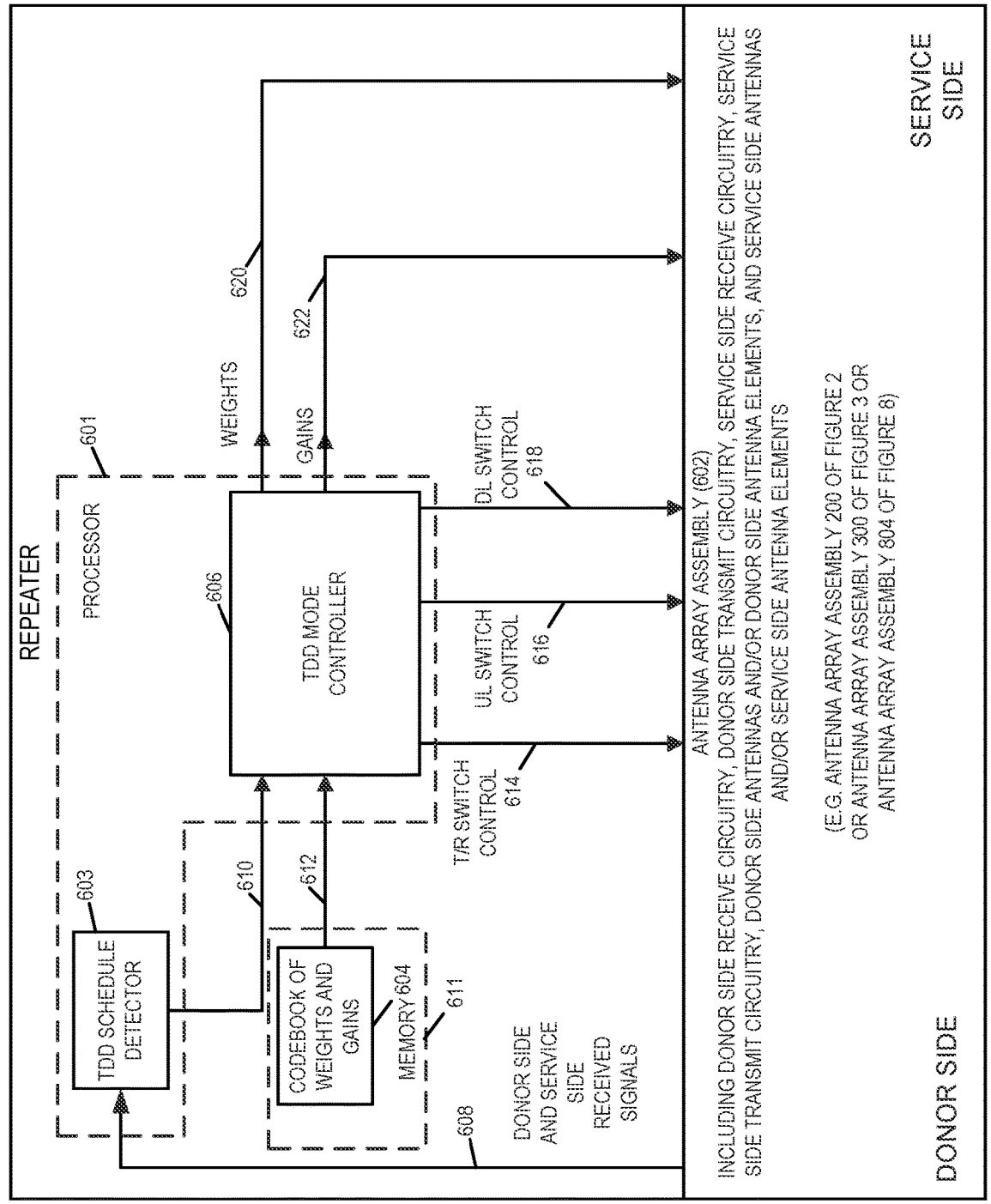
FIG. 6 is a drawing of an exemplary repeater in accordance with an exemplary embodiment.

FIG. 6 is a drawing of an exemplary repeater 600 in accordance with an exemplary embodiment. Exemplary repeater 600 includes antenna array assembly 602, e.g., antenna array assembly 200 of FIG. 2 or antenna array assembly 300 of FIG. 3, a processor 601 and a memory 611 which are coupled together by a bus formed by connections 610, 612, 620, 622, 614, 616 and 618 over which data and control signals can be transmitted. The processor 601 controls the repeater to operate in accordance with the invention, e.g., to implement any one of the methods shown in the other figures of the application which show steps or the methods implemented by a repeater. The processor 603 includes a time division duplex (TDD) schedule detector 603 and a TDD mode controller 606 which in some embodiments are implemented in hardware but in other embodiments are implemented by the processor running software which configures the processor to control the repeater in accordance with the invention. A codebook of weights and gains 604 is stored in memory 611 and can be accessed as needed by the processor 601 to retrieve and/or determine the sets of weights and gains to be used at a particular point in time based on a determined TDD schedule that can be detected by the detector 603 based on received information and/or signals. One or more TDD schedules maybe and sometimes are also stored in memory 611. In some embodiments the memory 611 includes the assembly of components shown in FIG. 9 which comprises the combination of FIGS. 9A and 9B. The codebook of weights and gains 604, is, e.g., one of codebook 400 of FIG. 4 or codebook 500 of FIG. 5.

Donor side and service side received signals 608 are input to TDD schedule detector 602, which processes the received signals, determines when a mode change should occur, and generates signals 610, communicating information indicating when a mode change should occur, e.g., from uplink mode to downlink mode or from downlink mode to uplink mode, to the TDD code controller. In some embodiments, the TDD schedule detector 603 receives at least one of a system information broadcast (SIB) or a slot format information (SFI) broadcast and decodes the received signal to recover TDD timing information, e.g., a TDD timing schedule, and uses the recovered TDD timing schedule and current time with respect to the schedule to detect transitions, e.g., from uplink mode of operation to downlink mode of operation, or from downlink mode of operation to uplink mode of operation. In some other embodiments, the TDD schedule detector 603 monitors for and detects gaps in base station and UE transmissions, and uses the detected gap and information indicating whether the transmission preceding the gap were downlink or uplink, to detect the transition, e.g., from uplink to downlink mode of operation or from downlink to uplink mode of operation.

The TDD mode controller 606 uses the received TDD schedule detection information 610 and codebook information 612, to determine, e.g., based on a codebook lookup, a set of weight values 620 and a set of gains values 622 which are input to the antenna array assembly 602. In addition the TDD mode controller 606 generates T/R switch control signals 614, UL switch control signal 616 and DL switch control signals, which are sent to the antenna array assembly.

Figure 7A:
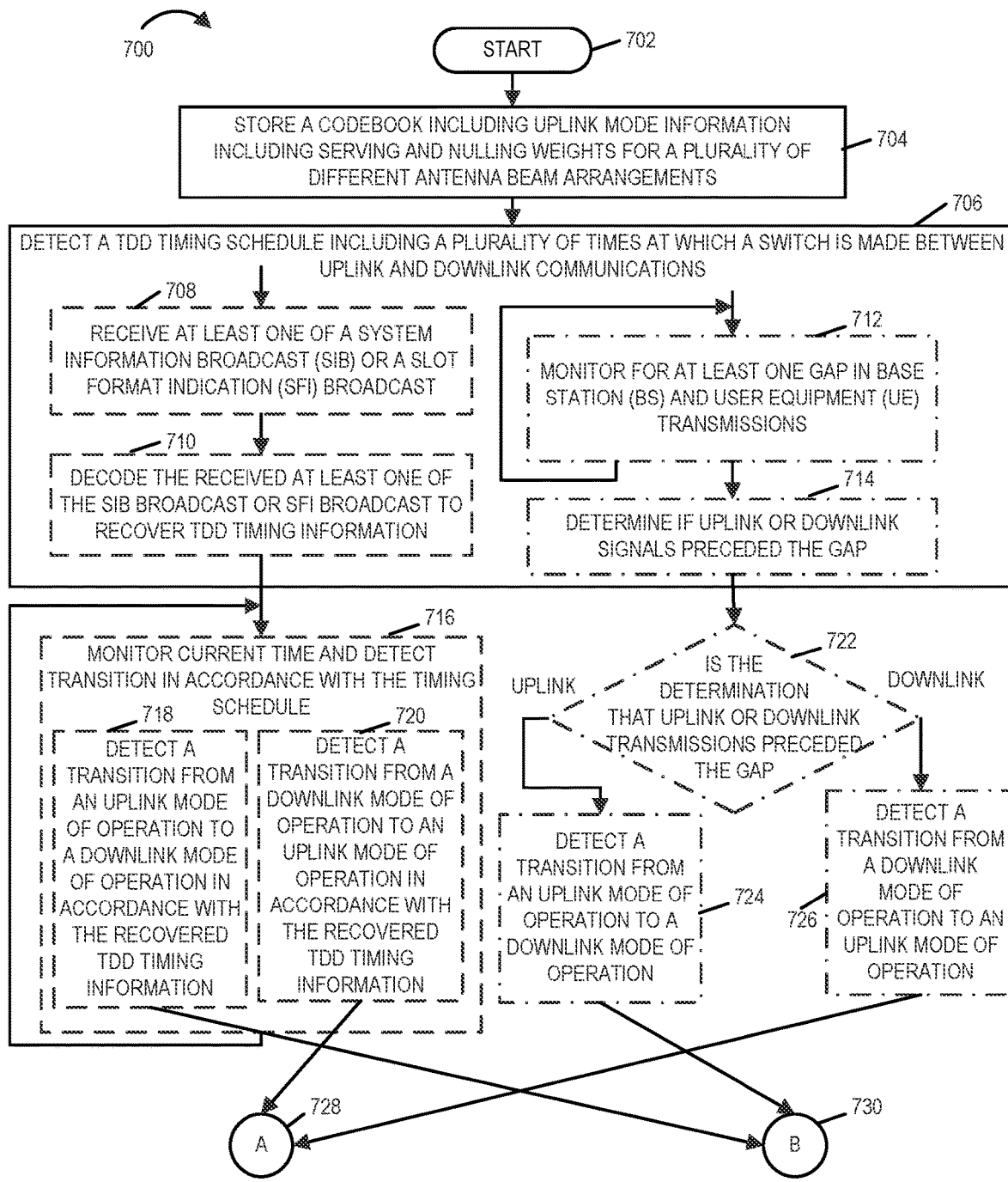
FIG. 7A is a first part of a flowchart of an exemplary method of operating a repeater, e.g., the repeater of FIG. 6, in accordance with an exemplary embodiment.

FIG. 7, comprising the combination of FIG. 7A and FIG. 7B, is a flowchart 700 of an exemplary method of operating a repeater, e.g., repeater 600 of FIG. 6, in accordance with an exemplary embodiment. Operation of the exemplary method starts in step 702, in which the repeater is powered on and initialized. Operation proceeds from step 702 to step 704.

In step 706 the repeater detects a time division duplex (TDD) timing schedule including a plurality of time at which a switch is made between uplink and downlink communications. In some embodiments, step 706 includes steps 708 and 710. In some other embodiments, step 706 includes step 712 and 714.

In step 708 the repeater receives at least one of a system information broadcast (SIB) or a slot format information (SFI) broadcast. Operation proceeds from step 708 to step 710. In step 710 the repeater decodes the received at least one of the SIB broadcast or SFI broadcast to recover TDD timing information. Operation proceeds from step 710 to step 716.

In step 716 the repeater monitors current time and detects a transition in accordance with the timing schedule. Step 716 includes steps 718 and 720, one of which is performed for each detected transition. Step 716 is performed repetitively, e.g., on an ongoing basis. In step 718 the repeater detects a transition from an uplink mode of operation to a downlink mode of operation in accordance with the recovered TDD timing information. Operation proceeds from step 718, via connecting node B 730 to step 738. Returning to step 720, in step 720 the repeater detects a transition from a downlink mode of operation to an uplink mode of operation in accordance with the recovered TDD timing information. Operation proceeds from step 720, via connecting node A 728 to step 732.

Returning to step 712, in step 712 the repeater monitors for at least one gap in base station (BS) and user equipment (UE) transmissions. Step 712 is performed repetitively, e.g., on an ongoing basis. Operation proceeds from step 712 to step 714. In response to a detected gap, in step 714 the repeater determines if uplink or downlink signals preceded the gap. Operation proceeds from step 714 to step 722. In step 722, if the repeater has determined that the uplink transmission preceded the gap, then operation proceeds from step 722 to step 724, in which the repeater detects a transition from an uplink mode of operation to a downlink mode of operation. Operation proceeds from step 724, via connecting node B 730 to step 738.

Returning to step 722, if the repeater has determined that the downlink transmission preceded the gap, then operation proceeds from step 722 to step 726, in which the repeater detects a transition from a downlink mode of operation to an uplink mode of operation. Operation proceeds from step 726, via connecting node A 728 to step 732.

Returning to step 732, in step 732 the repeater sets a first set of donor side antenna receiver weights to a first set of values which causes constructive cancellation when combining signal received from donor side receive antenna outputs of a donor side antenna. Operation proceeds from step 732 to step 734. In step 734 the repeater decrease the gain of a donor side receiver amplifier by decreasing a voltage supplied to the donor side receiver amplifier to by decreasing a bias current supplied to the donor side receiver amplifier. In some embodiments, step 734 includes step 736 in which the repeater reduces the voltage supplied to the amplifier to a lower voltage than a voltage which is supplied during the downlink mode of operation. Operation proceeds from step 734 to step 744.

Returning to step 738, in step 738 the repeater sets the first set of donor side antenna receiver weights to a second set of values used in said downlink mode of operation, said second set of values differing from said first set of values in terms of phase components but not in terms of amplitude components. In some embodiments in step 738 the repeater automatically controls which of a plurality of antenna weights is used at a given time, and in some cases automatically selects, based on a received or selected set of control information which of a plurality of donor side antenna weights are used at a given time, e.g., based on the TDD timing schedule.

Operation proceeds from step 738 to step 740. In step 740 the repeater increases the gain of a donor side receiver amplifier by increasing a voltage supplied to the donor side receiver amplifier to by increasing a bias current supplied to the donor side receiver amplifier. In some embodiments, step 740 includes step 742 in which the repeater increases the voltage supplied to the amplifier to a higher voltage than a voltage which is supplied during the uplink mode of operation. Operation proceeds from step 740 to step 744.

In step 744 the repeater controls a donor side switch to change between a transmit and receive position based on the TDD timing schedule. Operation proceeds from step 744 to step 746.

In step 746 the repeater receives a signal and re-transmits said signal in accordance with a set of control information including switch setting, antenna weights and antennas gains. In some embodiments, step 746 includes step 748, in which the repeater receives said signal and re-transmits said signal in accordance with the set of control information including switch setting, antenna weights and antennas gains without performing decoding/encoding operations and/or decrypting/encrypting operations. In some embodiments, step 748 includes step 750 in which the repeater uses a beam which is narrower for donor side communications than for service side communications.

Figure 8:
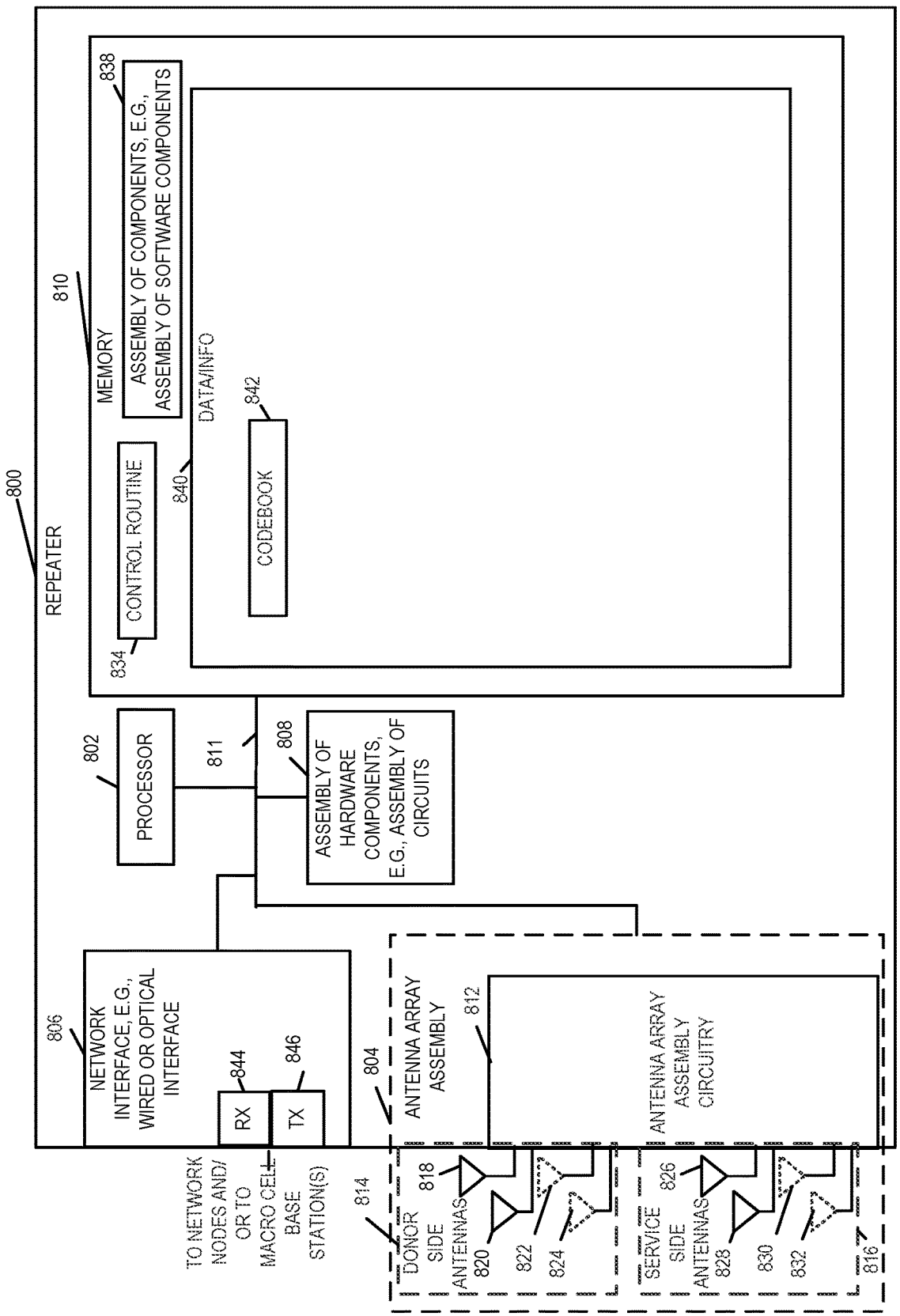
FIG. 8 is a drawing of an exemplary repeater in accordance with an exemplary embodiment.

FIG. 8 is a drawing of an exemplary repeater 800 in accordance with an exemplary embodiment. Exemplary repeater 800 is, e.g., repeater 106 of system 100 of FIG. 1, repeater 600 of FIG. 6, and/or a repeater implementing the method of flowchart 700 of FIG. 7.

Repeater 800 includes a processor 802, e.g., a CPU, an antenna array assembly 804, a network interface 806, e.g., a wired or optical interface, an assembly of hardware components 808, e.g., an assembly of circuits, an memory 810 coupled together via a bus 811 over which the various elements many interchange data and information. Network interface 806 includes a receiver 844 and a transmitter 846. Network interface 806 couples the repeater 800 to network nodes, e.g., network node 110, and/or to macro cell base stations, e.g., via a backhaul network. In many cases a network interface is not needed and not included in the repeater. In at least some applications the point of putting in a repeater is to avoid the need for extending a backhaul and the corresponding associated cost. In such applications a repeater without a network interface for a wired backhaul connection can be cost effective. In some such cases control and/or configuration of the repeater can be and is supported by using a wireless channel and the repeaters wireless interface for device configuration and management. In some such cases the wireless channel used for repeater device configuration is referred to as a side channel since it is different from, and often separate from, the wireless channel or channels used to communicate control information and data to UE devices. Thus in at least some embodiments the repeater does not have a wired or optical network interface with control and configuration being via one of the wireless interfaces included in the repeater. Accordingly, while a wired network interface is shown in various figures it is an optional element and is not included in at least some embodiments and in such embodiments the network interface maybe implemented as a wireless network interface.

Antenna array assembly 804 includes antenna array assembly circuitry 812, donor side antennas 814 and service side antennas 816 coupled together. Donor side antennas 814 includes donor side antennas or donor side antenna elements (818, 802). In some embodiments, donor side antennas 814 further includes donor side antennas or donor side antenna elements (822, 824). Service side antennas 816 includes service side antennas or service side antenna elements (826, 828). In some embodiments, service side antennas 816 further includes service side antennas or service side antenna elements (830, 832). In some embodiments, antenna array assembly 804 is antenna array assembly 200 of FIG. 2; donor side antennas (818, 820, 822, 824) of antenna array 804 are donor side antennas (202, 204, 262, 264) of antenna array 200 of FIG. 2; and service side antennas (826, 828, 830, 832) of antenna array 804 are service side antennas (230, 232, 234, 236) of antenna array 200 of FIG. 2. In some embodiments, antenna array assembly 804 is antenna array assembly 300 of FIG. 3; donor side antennas (818, 820) of antenna array 804 are donor side antennas (302, 304) of antenna array 300 of FIG. 3; and service side antennas (826, 828) of antenna array 804 are service side antennas (334, 336) of antenna array 300 of FIG. 3. In some embodiments, antenna array assembly 804 is antenna array assembly 602 of FIG. 6. Repeater 800 communicates with a base station, e.g., base station 1 102, via wireless signals communicated via donor side antennas 814. Repeater 800 communicates with a UE, e.g., UE 1C 122, via wireless signals communicated via service side antennas 816.

Memory 810 includes a control routine 834 an assembly of components 838, e.g., an assembly of software components, and data/information 840. Data information 840 includes a codebook 842. Codebook 842 is, e.g., codebook 400 or FIG. 4 or codebook 500 of FIG. 5.

Figure 9A:
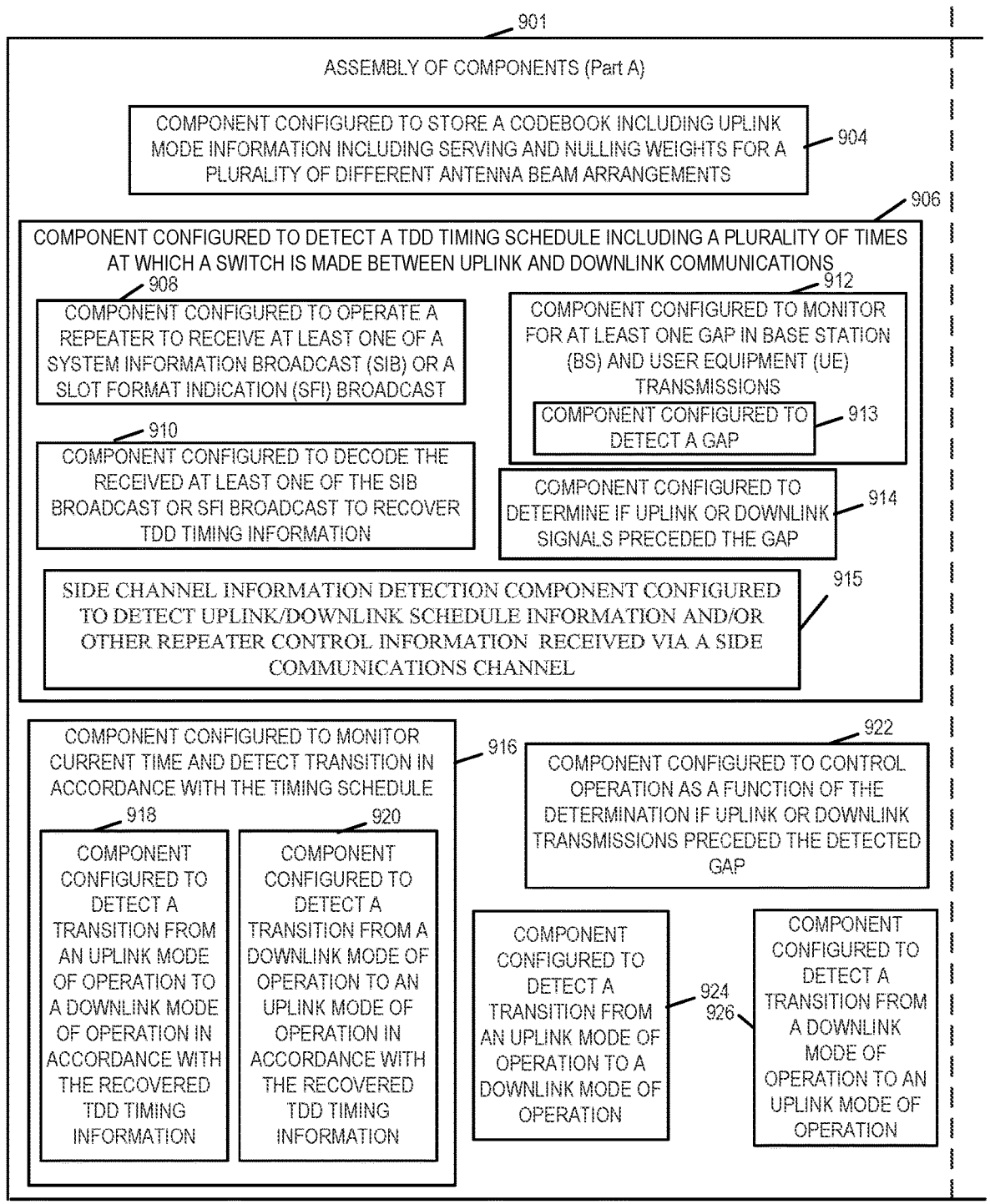
FIG. 9A is a first part of an exemplary assembly of components, which may be included in a repeater in accordance with an exemplary embodiment.
Figures 9, 9B:
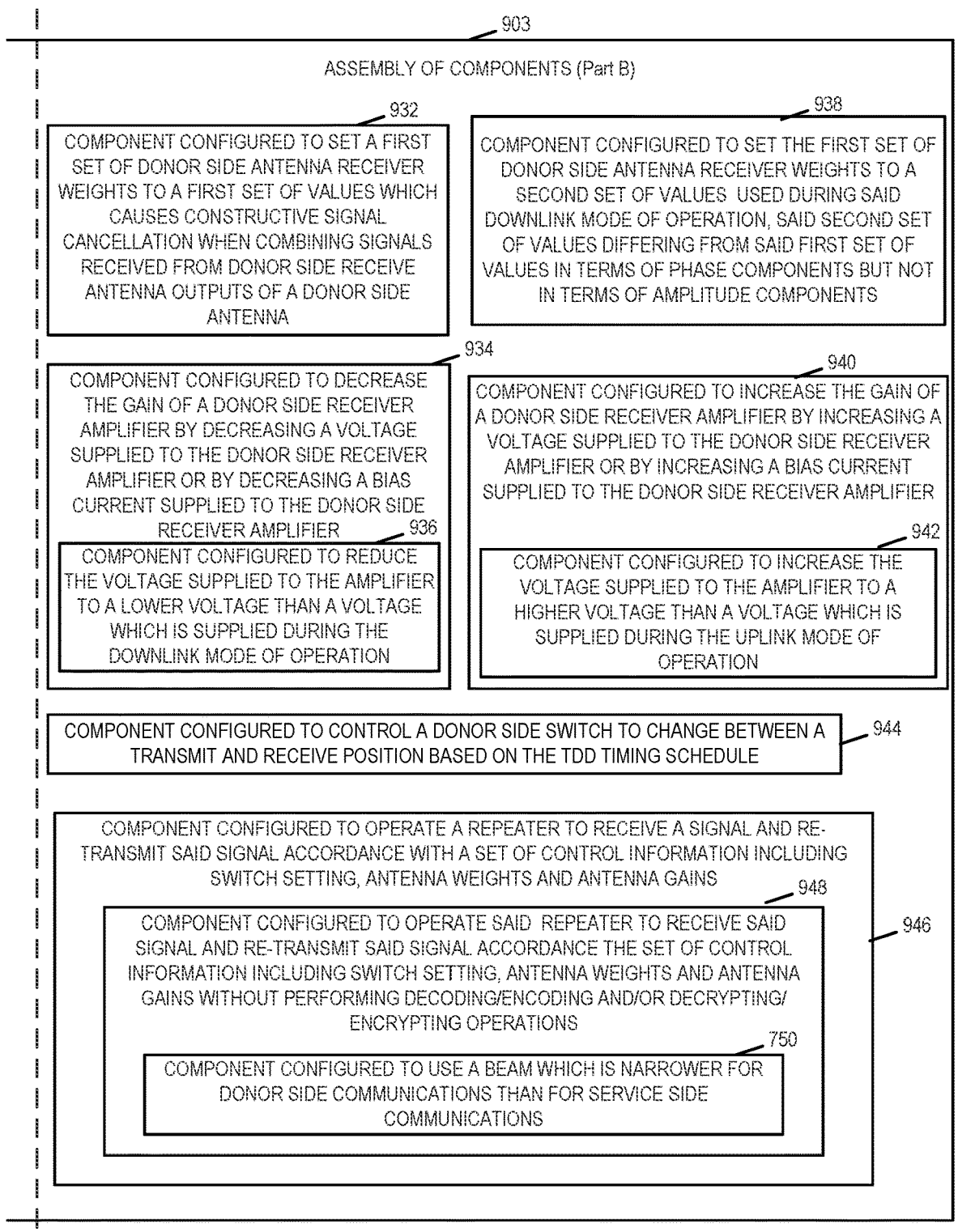
FIG. 9B is a second part of an exemplary assembly of components, which may be included in a repeater in accordance with an exemplary embodiment.
FIG. 9 comprises the combination of FIG. 9A and FIG. 9B.

FIG. 9, comprising the combination of FIG. 9A and FIG. 9B, is a drawing of an assembly of components 900, comprising the combination of Part A 901 and Part B 903, in accordance with an exemplary embodiment. The assembly of components 900 can be and sometime is included in the exemplary repeater 106 of FIG. 1, exemplary repeater 800 of FIG. 8, exemplary repeater 600 of FIG. 6, a repeater implementing the method flowchart 700 of FIG. 7, and/or a repeater shown and/or described with respect to any of the other figures.

The components in the assembly of components 900 can, and in some embodiments are, implemented fully in hardware within the processor 802, e.g., as individual circuits. The components in the assembly of components 900 can, and in some embodiments are, implemented fully in hardware within the assembly of components 808, e.g., as individual circuits corresponding to the different components. In other embodiments some of the components are implemented, e.g., as circuits, within the processor 802 with other components being implemented, e.g., as circuits within assembly of components 808, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 810 of the repeater 800, with the components controlling operation of the repeater to implement the functions corresponding to the components when the components are executed by a processor, e.g., processor 802. In some such embodiments, the assembly of components 900 is included in the memory 810 as assembly of components 838. In still other embodiments, various components in assembly of components 900 are implemented as a combination of hardware and software, e.g., with another circuit external to the processor 802 providing input to the processor 802 which then under software control operates to perform a portion of a component's function. While processor 802 is shown in the FIG. 8 embodiment as a single processor, e.g., computer, it should be appreciated that the processor 802 may be implemented as one or more processors, e.g., computers.

When implemented in software the components include code, which when executed by the processor 802, configure the processor 802 to implement the function corresponding to the component. In embodiments where the assembly of components 900 is stored in the memory 810, the memory 810 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the repeater 800, or elements therein such as the processor 802, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., steps of the method of flowchart 700 of FIG. 7 and/or described or shown with respect to any of the other figures.

Assembly of components 900 includes a component 904 configured to store a codebook including uplink mode information including serving and nulling weights for a plurality of different antenna beam arrangements, and a component 906 configured to detect TDD timing schedule including a plurality of times at which a switch is made between uplink and downlink communications. Component 906 includes a component 908 configured to operate a repeater to receive at least one of a system information broadcast (SIB) or a slot format information (SFI) broadcast, a component 910 configured to decide the received at least one of the SIB or the SFI broadcast to recover TDD timing information, a component 912 configured to monitor for at least one gap in base station (BS) and user equipment (UE) transmissions. Component 912 includes a component 913 configured to detect a gap. Assembly of components 900 further includes a component 914 configured to determine if uplink or downlink communications preceded the gap, e.g. a gap detected during the monitoring. The set of components 900 also includes, in some embodiments, a side channel information detection component 915 configured to detect uplink/downlink schedule information and/or other repeater control information that can be and sometimes is received via a side communications channel, e.g., a channel that is not used for communicating data or control information between a base station and UE. The side channel maybe a wireless side channel or a wired side channel. The side channel is not used in all embodiments and in cases where a wireless side channel or other side channel is not used component 915, may be and sometimes, is omitted from the repeater.

Assembly of components 900 further includes a component 916 configured to monitor current time and detect a transition in accordance with the TDD timing schedule. Component 916 includes a component 918 configured to detect a transition from an uplink mode of operation to a downlink mode of operation in accordance with the recovered TDD timing information and a component 920 configured to detect a transition from a downlink mode of operation to an uplink mode of operation in accordance with the recovered TDD timing information.

Assembly of components 900 further includes a component 922 configured to control operation as a function of the determination if uplink or downlink transmissions preceded the detected gap, a component 924 configured to detect a transition from an uplink mode of operation to a downlink mode of operation, e.g. in response to detecting a gap and determining the uplink signals preceded the gap, and a component 926 configured to detect a transition from a downlink mode of operation to an uplink mode of operation, e.g. in response to detecting a gap and determining the downlink signals preceded the gap.

Assembly of components 900 further includes a component 932 configured to set a first set of donor side antenna receiver weights to a first set of values which causes constructive signal cancellation when combining signals received from donor side receive antenna output of a donor side antenna and a component 934 configured to decrease the gain or a donor side receiver amplifier by decreasing a voltage supplied to the donor side receiver amplifier or by decreasing a bias current supplied to the donor side receiver amplifier. Component 934 includes a component 936 configured to reduce the voltage supplied to the amplifier to a lower voltage than a voltage with is supplied during the downlink mode of operation.

Assembly of components 900 further includes a component 938 configured to set the first set of antenna donor side antenna receiver weights to a second set of values used during said downlink mode of operation, said second set of values differing from said first set of values in terms of phase components but not in terms of amplitude components, and a component 940 configured to increase the gain of a donor side receiver amplifier by increasing a voltage supplied to the donor side receiver amplifier or by increasing a bias current supplied to the donor side receiver amplifier. Component 940 includes a component 942 configured to increase the voltage supplied to the amplifier to a higher voltage than a voltage which is supplied during said uplink mode of operation.

Assembly of components 900 further includes a component 944 configured to control a donor side switch to change between a transmit and receive position based on the TDD timing schedule, and a component 946 configured to operate a repeater to receive a signal and re-transmit said signal in accordance with a set of control information including switch setting, antenna weights and antenna gains. Component 946 includes a component 948 configured to operate said repeater to receive said signal and re-transmit said signal in accordance with the set of control information including switch setting, antenna weights and antenna gains without performing decoding/encoding and/or decrypting/encrypting operations. In some embodiments component 948 automatically controls which of a plurality of antenna weights is used and in some cases automatically selects based on the set of control information which of a plurality of donor side antenna weights are used at a given time, e.g., based on the TDD timing schedule. Component 948 includes a component configured to use a beam which is narrower for the donor side communications (base station/repeater communications) than for service side communications (repeater/user equipment communications).

Figure 10:
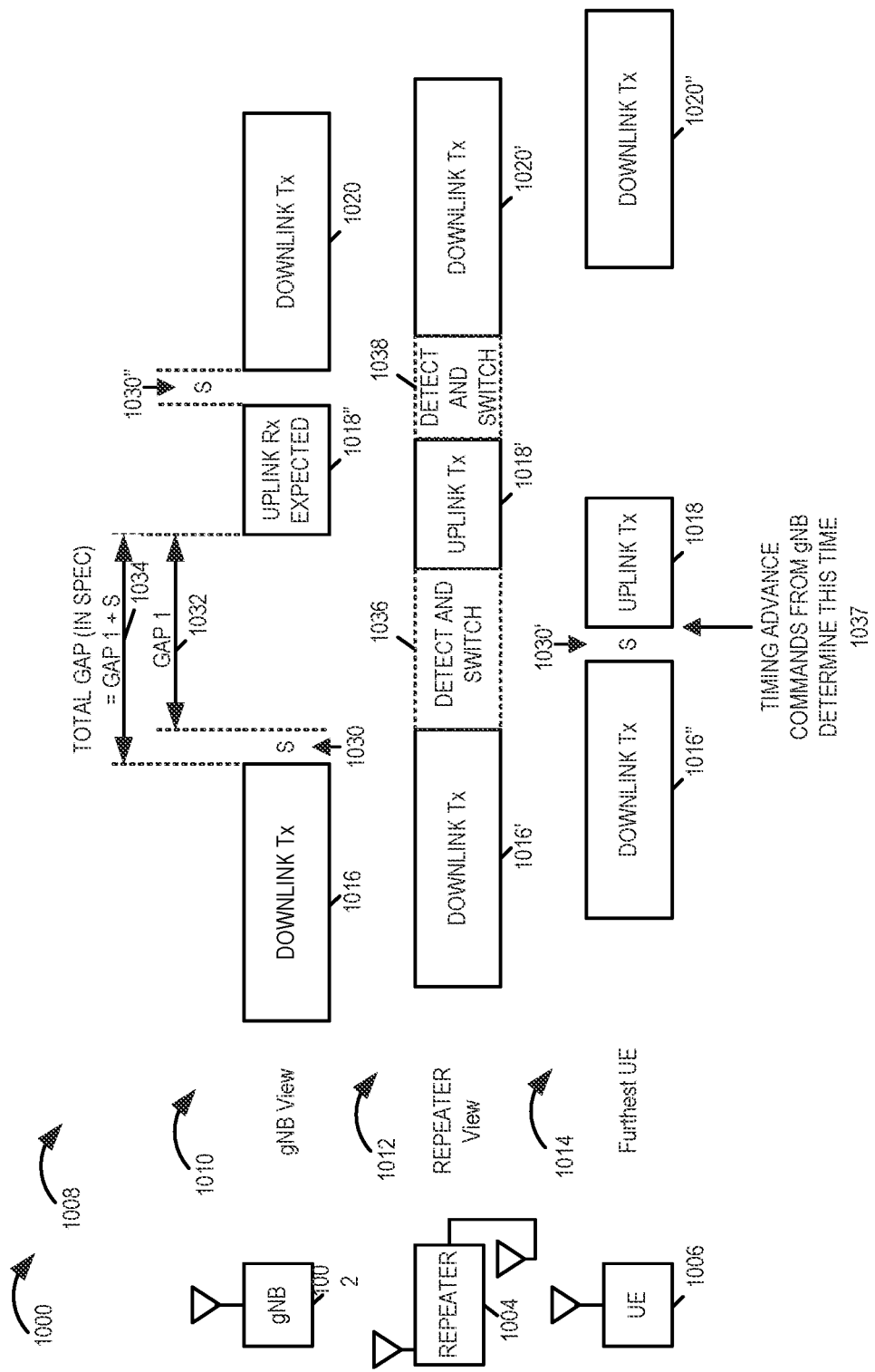
FIG. 10 shows timing diagrams for autonomous TDD switch detection at a repeater with elements of the system being shown on the left, timing diagram corresponding to the element being shown on the right and the timing scale being consistent between the different elements as time progresses from the left side to the right side of the timing diagrams which are aligned to help understanding of the timing relationship between the operation of the different components.

FIG. 10 is a diagram 1000 showing a set 1008 of timing diagrams for autonomous TDD switch detection at a repeater 1004 with elements of the system being shown on the left, timing diagram corresponding to the element (gNB) 1002, Repeater 1004 and UE 1006, being shown on the right and the timing scale being consistent between the different elements as time progresses from the left side to the right side of the timing diagrams which are aligned to help understanding of the timing relationship between the operation of the different components. Timing diagram 1010 relates to gNB, e.g., base station, operation. Timing diagram 1012 relates to repeater operation and timing diagram 1014 relates to operation of the UE 1006 which maybe and sometimes is the use furthest form the gNB 1002 and which is being services via the repeater 1004 which maybe and sometimes is a repeater implemented in accordance with the invention such as one or the repeaters shown in the one or more of the other figures of the application. In FIG. 10 the set of timing diagrams 1008 includes a timing diagram corresponding to the base station 1002, e.g., gNB, which includes a downlink transmission TX time period 1016 followed by a switching time period 1030 in which a switch from downlink transmission at the gNB to uplink mode of operation is implemented. In addition to the switching period 1030 there is a gap period GAP 1 1002 during which the base station 1002 refrains from transmitting, The total gap between the point at which the switch from uplink to downlink operation has a time duration of GAP 1 plus S where S is the time 1030 in which the switch is made. The switch and gap periods are followed at the base station by an uplink transmission period 1018" which is followed by another switching period 1030 in which the base station switches from uplink back to downlink transmission mode with downlink transmissions then occurring in the downlink transmission period 1020.

The repeater 1004 is some distance away from the base station 1004 and will receive the downlink signals transmitted by the base station 1012 in the downlink Tx period 1016' and retransmit these signals received at the donor side receiver to the UE devices via the repeaters service side transmitter. During the detect and switch period 1036, the repeater can and will detect the falloff, e.g., stopping, of signals from the base station 1002 and interpret that as an indication that there is a switch to uplink TX mode which is occurring. The repeater than operates during uplink TX mode 1018' in uplink mode retransmitting the signals received from the service side receiver(s), e.g., from one or more UE devices via the donor side transmitter(s) of the repeater without the signals being decoded. The silence period 1030' in which switching to downlink transmission mode occurs at the base station is detected by the repeater during period 1038 based on the fall off of UE signals that are being received for retransmission. During period 1038 the repeater 1004 switches back to downlink mode of operation with signals being received from the base station 1002 being transmitted to the UE and/or other CPE devices within coverage are of the repeater 1004. The set of gains and weights used for controlling signal amplification and/or combining maybe and sometimes are obtained from memory based on the uplink or downlink mode of operation being implemented at the repeater 1004 and/or the antenna array beam pattern being used during the uplink/downlink mode of operation that is implemented based on the mode of operation determined based on the received signals.

The last timing diagram 1014 of FIG. 10 shows the timing sequence at a UE, e.g., furthest from the base station 1002. The UE 1006 is likely to receive signals transmitted by the service side of the repeater 1004 in addition to the original signals from the gNB. The signals maybe treated by the UE as multipath signals with the UE being unaware that some of the signals are from the repeater transmission. It should be appreciated that the signal from the gNB and repeated signal transmitted by the UE will both be received in at least some embodiments within a cyclic prefix time period an easily processed without the UE having to know of the presence of the repeater 1004.

UE timing diagram 1014 includes a downlink time period 1016" in which downlink signals from the base station 1002 and repeater 1004 are received and combined followed by switching period 1030' which is then followed by an uplink transmission time period 1018 which has a starting point in time 1037 determined by a timing advance signal from the base station 1002 which is directed to UE 1006. As with the UE the base station need not know of the presence of the repeater and timing controls the individual UEs but does not send individual timing advance signals to individual repeaters. Following the uplink transmission period 1018 in which the UE 1006 transmits to the base station 1002 the UE 1006 remains silent, e.g., while other UEs transmit to the base station. The UE then resumes downlink operation for time period 1020 in which it receives signals transmitted by both the base station 1002 and repeater 1004 transmit to the UE 1006.

Various aspects of the invention relate to repeater stability will now be described. From a terminology perspective, the repeater has two sides to it, the side facing the infrastructure, e.g., a base station, which is called donor-side and the side facing the device, (e.g, User Equipment device or customer premises equipment (CPE)), which is called service-side. The goal of a bi-directional repeater is to receive from the donor (service) side, amplify and then retransmit the signal on the service (donor) side during downlink operation of the system so that CPEs receive signals from the base station and to receive from the service side, amplify and then retransmit the signal on the donor side during uplink operation of the system so that the base station receives signals from the CPE devices.

Repeaters face the issue of stability due to signal leakage/self-interference. Consider the forward path where the donor-side signal is received, amplified and transmitted on the service side. In this case since a receive operation (from the donor) happens simultaneously with a transmit operation (to the final receiver), there is a risk of the transmit signal leaking back into the receiver, over-the-air. This creates a feedback loop that can be guaranteed to be stable if the gain in the signal path is smaller than the reciprocal of the gain in the feedback path—in other words, the gain that the repeater can operate at is bounded by the attenuation from the service side transmitter antenna to the donor side receive antenna. The repeater maybe unstable if this is not the case. Consider for example, if the target gain for the repeater is say 80 dB, then the attenuation of the signal from the service side transmitter antenna to the donor side receiver antenna must be at least 80 dB or better for the repeater to be stable. By instability we mean that for a finite input signal level into the repeater, the output level will gradually keep increasing indefinitely, causing output circuits to saturate and output signals to distort significantly. A primary method of ensuring stability is by trying to isolate the two antennas from each other, either by physically separating them and/or shielding them from each other to reduce the leakage. Other methods, such as active cancellation of the leakage, may be needed in certain situations.

Another source of interference is the donor-to-donor side and service-to-service side transmitter-to-receiver interference (we will call this 'same-side' or 'duplexing' interference). This is typically handled by a duplexing constraint and is not unique to repeaters. However, the level of 'same-side' interference does impact the maximum gain of the repeater and is therefore coupled. Note that even though each of the donor and service sides depict a separate Tx and Rx, this model is equally valid for common Tx and Rx antenna on each side.

Even if there is perfect isolation between the donor and service sides, the presence of 'same-side' interference will still limit the maximum gain of the repeater for which stability is preserved. Typical duplexing methods are frequency division duplexing (FDD), time division duplexing (TDD) and full duplex (FD).

In FDD, the transmit and receive signals on the same-side of the repeater would be separated by a fairly large frequency separation. Furthermore, filters maybe and sometimes are used to cut-off unwanted interference from transmitter to receiver. Such filtering could typically accomplished using an RF device called a duplexer.

In TDD systems, the same frequency band or channel is used for both transmit and receive operation but they are done at different times. Switching between transmit mode and receive mode is done at well-defined times, usually announced and managed by the base station. The T/R switch manages which signal path is connected at any given time. In real world conditions the T/R switch will not provide perfect isolation between the paths.

In Full Duplex (FD) repeaters, transmission and reception happens simultaneously in the same band. A three-port RF device called the circulator may be used to separate out the transmit and receive paths. A circulator would allow signal to flow from Port 1 to Port 2 but not Port 3 and similarly from Port 2 to Port 3 but not port 1 and port 3 to port 1, but not port 2. Since the device will not perfectly suppress signal going into the undesired port, some leakage may be expected from imperfect isolation. In single-antenna systems this typically requires active interference cancellation of the residual leakage.

It is important to note that a TDD repeater wherein the repeater does NOT have knowledge of the underlying TDD structure, can be implemented like an FD repeater.

In some but not all embodiments of the present invention the TDD structure is learnt at the repeater and then exploited to avoid unnecessarily building or using a FD repeater.

Various aspects related to Millimeter Wave Repeaters will now be described. The repeaters of the present invention are in many embodiments Millimeter Wave Repeaters. The main difference between repeaters for millimeter wave systems and those for sub-6 GHz systems is that millimeter wave systems use antenna arrays for communication. Antenna arrays allow the formation of beams which allow the signal to be focused in the direction of interest, thereby overcoming some of the propagation challenges at these frequencies. In various embodiments a millimeter wave repeater will have separate antenna arrays for the donor and service sides. For example, the donor-side antenna array could be of size 256 antenna elements and so can the service side.

In addition to the modes of interference present in a single-antenna system discussed earlier in this document, there is over-the-air interference between the 'same-side' antenna elements that needs to be dealt with in millimeter wave systems. If the same array is used for transmit and receive, then in some embodiments we replicate the single antenna structures. This architecture, while compact, can lead to a high 'same-side' self-interference. Another approach used in some embodiments is to use different arrays for transmit and receive on each of the donor and receive sides.

Most 5G millimeter wave deployments as well as the 802.11 deployments are expected to be TDD. If the TDD structure is known at the receiver, then it can be exploited to reduce the extent of self-interference in both the common and separate antenna configurations.

The one advantage of a common antenna structure is that it requires much less hardware compared to the separate antenna structures. The main disadvantage is that the elements within each array have to be placed fairly close to each other to achieve beamforming gain—typically, they would be placed half a wavelength apart, which at 30 GHz frequency comes out to be around 0.5 cm. Clearly, a close placement like that would make the over-the-air coupling and resultant interference to be fairly high. Use of multiple separate antenna structures allows the transmit and receive array to be placed on each side of the repeater a little bit further away (several centimeters away) from each other, thereby reducing the extent of coupling and self-interference as compared to other implementations. Each array can then respect its requirement for half-wavelength separation between its elements. One disadvantage of the separate array approach is of course that it requires double the number of elements and some of the associated RF circuitry would also require duplication.

In both approaches, the interference mitigation, in accordance with the invention can be enhanced by using the antenna weights to null the self-interference, e.g. with the weights being determined from a look up table or tables for a given mode of operation.

In this figure, when downlink traffic is flowing (e.g., when the donor will receive (Rx), and the service side will transmit (Tx), the weights on the service Rx antennas can be selected to null the interference. Taken together with the switch isolation, this can provide substantial reduction in self-interference. This can and is done in some embodiments when the TDD structure is known. In such an embodiment the weights that are sued will alternate between the 'nulling' weights and the 'beam forming' weights depending on whether downlink or uplink operations is being supported at a given time.

Let's assume downlink flow of data and so the weights we select to null will be on the service Rx antennas. Let hi, be the effective channel response on service Rx antenna i from service Tx antenna j. The reason this is called 'effective' channel is because it is the product of the weight chosen on service Tx antenna j and the actual channel coefficient. The transmitted signal prior to weight application on each of the antennas is the same and therefore, the signal at the output of the service Rx antenna combiner is w1s*(h1,1+h1,2)*s+w2s*(h2,1+h2,2)*s. This can be set to zero by arbitrarily assigning one weight to unity and selecting the second weight so that the above weighted sum yields zero. Note that this will be true regardless of the sample s. In practice, one can select balanced weights, rather than select one to be unity. Note that this method extends to any number of antennas, not just two. Also, it is assumed here that the effective channel coefficients are computed through offline calibration.

This can be set to zero by arbitrarily assigning one weight to unity and selecting the second weight so that the above weighted sum yields zero. Note that this will be true regardless of the sample s. In practice, one can select balanced weights, rather than select one to be unity. Note that this method extends to any number of antennas, not just two. Also, it is assumed here that the effective channel coefficients are computed through offline calibration.

In addition to (a) separating antennas for Tx and Rx (b) exploiting the TDD structure to switch paths on and off as needed (c) using antenna weights to null the self-interference, active cancellation as shown for the full-duplex repeater case can be, and is, undertaken to further reduce the interference in some embodiments. Furthermore, optionally, the amplifier gain in the unused direction can be turned down to almost zero gain thereby reducing or minimizing the feedback interference. In addition or alternatively, the supply voltage to the power amplifiers in the unused direction can be and sometimes is cut to further reduce feedback interference.

While the power can be changed to the amplifiers in the direction in which transmission is to be avoided, in some embodiments power to the amplifiers in both directions is held control is achieved by controlling the gain or other weights used in the transmit or receive side to minimize or avoid interference to the side of the repeater which is in use for the base station or device facing portions of the repeater.

Thus, it should be appreciated that knowledge of the TDD structure at the repeater can be used to effectively manage the self-interference and thereby operate the repeater at very high stable gain.

One simple method to obtain information about the TDD structure that is used in some embodiments to decide how to control the repeater during a given time period is for the base station, e.g., gNB, to inform the repeater of the upcoming structure. In some LTE embodiments for example, the structure is a repeating pattern over a 1 ms interval and the LTE standard specifies an allowed set of patterns to select from. This information of which of the TDD patterns is to be used at a given time is provided by the base station in a broadcast message (called SIB). In various embodiments the TDD structure message, e.g., SIB, is received and decode by the repeater to learn the TDD structure. Similar mechanisms are available in 5G NR standard that may be exploited to learn the TDD structure. If the TDD configuration is not conveyed through an existing SIB message, then a new SIB message may be sent, in accordance with some embodiments, with a message ID that is outside the range of values supported in the exiting specification thereby allowing the repeater of the present invention to recognize and understand the information in the new message providing the TDD structure information. Such an approach will not result in any improper behavior on UEs as they will just ignore the SIB message with the message ID that they are not to use or do not understand. Another method to inform the repeater of the invention of the TDD timing structure, that is used in some embodiments is to define and communicate an RNTI (a radio network temporary identifier) from the base station that is unique to repeaters and send the SIB message on this RNTI. UEs will not know this RNTI and as a result will discard a control channel message received with this RNTI. Yet another approach that is used in some embodiments is to provide the TDD timing structure information to the repeaters of the invention via an out-of-band side channel or have the repeater retrieve this information from a data base, e.g., at regular intervals. The side channel could be via LTE or some other wired or wireless communications channel.

There are some issues with relying on SIB or SIB-like signaling to communicate the TDD structure. Firstly, it may require the operator, e.g., base station operator, and base station (e.g. gNB) vendor to support the signaling. Often times the repeater is deployed by private parties, with operator certification, and the operator may not get involved at all. Secondly, the 5G NR standard allows for a much more dynamic TDD structure that is determined on the fly, rather than specified via configuration. In such cases, it is desirable for the repeater to autonomously learn the TDD switching structure. Support for autonomous learning of the TDD structure is included in some but not necessarily all embodiments.

In TDD systems a switch from downlink to uplink and vice-versa is preceded by a gap, which in a standard is typically represented by one or more blank symbols. Consider for example the gap shown in FIG. 10. The gap is intended to accommodate switching times at the transmitter and receiver and to allow for round-trip delay between the gNB and UE. The latter is because the UE needs to advance its timing as needed to arrive at the expected time at the gNB (whose time is regarded as fixed and golden). So, a UE who is close to the gNB will see smaller propagation delay and hence would not need to advance its timing on the uplink.

The method for gap detection at the repeater implemented in accordance with the invention, is to detect that the signal being received in a particular direction (i.e. downlink or uplink) has suddenly dropped substantially. Since the signal level drop at the edge of switch is substantial this detection should be relatively easy to make and not require substantial amount of noise averaging. Also, the switches will coincide with a symbol boundary and this information can be exploited as well to discover a switch. Accordingly, by monitoring signal levels at the repeater and recognizing a gap, switches between uplink and downlink operation can be detected and the repeater can switch so that it operates in the appropriate mode of operation given a detected switch in transmission directions.

Another aspect that is addresses with millimeter wave repeaters is beam management on both the donor and service sides of the link. The protocols used in both 5G and 802.11ad/ay systems for beam management are fundamentally based on beam sweeps at transmitter and receiver, followed by feedback signaling to execute a change in beams as needed. Note that often times transmit and receive beams are paired, and therefore, beam change would entail changing both beams synchronously.

Donor Side Beam Management

Initial Procedure: In 5G NR, the gNB sweeps the synchronization signal with regular periodicity. Each transmission of the synchronization signal is called a Synchronization Signal Block (SS Block). This is used by UEs to first acquire the downlink and lock in time, frequency and best beam. In addition to making measurements on each swept base station beam, the UE too sweeps through its receive beams to determine the best beam pair i.e. the best gNB transmit beam and the corresponding best UE receive beam. When the UE wants to establish a connection with the gNB, this is usually followed by a beamformed random access procedure. Once the connection is established, the gNB and UE typically use unicast signaling to measure, report and maintain or change as dictated by system dynamics.

A repeater in accordance with some aspects of the invention in some embodiments processes the swept SS blocks and its codebook of Rx beams in the same or similar way as a UE would for initial acquisition. From the set of Rx beams, the repeater selects the best and sets it to that value. The chosen Rx beam will also be used as the Tx beam for transmitting to the base station, e.g., gNB.

It is expected that the repeater will not be mobile and as a result the best donor side Tx and Rx beams are unlikely to change. The repeater could have multiple processing chains and therefore candidate Rx beams can be regularly scanned on one processing chain while one is locked on to the serving Rx beam. The candidate beam processing could discover that a better Rx beam than the one currently being used also requires the gNB's Tx beam to change. There are three alternative ways to deal with this that are used in various embodiments:

1. In-band signaling from repeater to gNB.
2. Out-of-band signaling from repeater to gNB
3. Autonomous adaptation at the repeater to effect this beam change via the UE.

In-band signaling from the repeater to gNB to execute beam changes can add significant complexity to the repeater. The repeater will have to behave like a UE on the donor link at least for the purpose of beam management. This would imply that upon acquisition, the repeater should send a random-access signal to the gNB to establish a connection and get an ID from the gNB. Subsequently, it will monitor the downlink control channel and send uplink control channels as required by 5G spec to execute beam management. During these periods, it will send uplink traffic that arrived over the service side link from UE and therefore, has to perform a multiplexing task.

Out-of-band signaling using a sub-6 GHz technology like LTE from repeater to gNB using special-purpose messaging as an application layer packet in LTE is another approach used in some embodiments. Upon receiving the Tx beam-change request from the repeater, the gNB can start offering the new beam in reference signals to the UE and ultimately, change the Tx beam in a timed manner. This is effectively the same protocol that would happen for a beam change between the gNB and the UE but involves the additional step of informing the repeater of the change ahead of time, so that the repeater can set its Rx beam correctly for the new gNB Tx beam.

Autonomous adaptation at the repeater of the Rx beam can eventually force the gNB to change its Tx beam. However, if the repeater switches the Rx beam suddenly, then that could cause the link to the UE to drop drastically resulting in temporary outage. The UE will eventually recover because it will find the new beam pair on the SS block sweep that is constantly undertaken by the gNB. Another approach would be for the repeater to use the weighted sum of the signals from the old and new Rx beams for a period of time to effect a soft transition. During this period, the normal beam sweep process at the gNB and UE will find the new beam pair and transition to it. However, the repeater will not have precise knowledge of the transition time and errors could occur in the process. Recovering from these errors is still feasible as the SS block sweep will eventually settle on the new beam pair.

For donor-side repeater transmissions, it is expected that reciprocity would be used, at least in some embodiments, to use the discovered Rx beam for Tx as well. This is a fairly standard assumption that is also made by the UE, in the non-repeater mode of operation.

Service Side Beam Management

On the service side (e.g. CPE device facing side), ideally the repeater should support fixed beams and repeat the received signal from the gNB on those beams simultaneously. This helps keep the repeater complexity low as it doesn't the repeater to implement per UE beam management protocols specified in 3GPP. The disadvantages of the fixed beams approach are that (a) beamforming gain cannot always be maximized to the UE and (b) number of beams needed could be large to cover the area with fixed beams while maintaining adequate minimum gain. By using higher power power amplifiers (PAs), beam broadening can be employed to efficiently tradeoff the number of beams that can be deployed on the service side with the minimum beamforming gain.

Exemplary Numbered Method Embodiments

Method embodiment 1. A method of operating a repeater comprising: detecting (706) a time division duplex (TDD) timing schedule including a plurality of times at which a switch is made between uplink and downlink communication; and controlling (744) a donor side switch (T/R switch) to change between a transmit position and a receive position based on the TDD timing schedule.

Method embodiment 1A. The method of Method embodiment 1, wherein said switch is a first transmit/receive switch that couples a first donor side antenna element to a first uplink signal path or a first downlink signal path at a given time.

Method embodiment 1B. The method of Method embodiment 1, wherein said switch is a donor side uplink switch that couples a donor side transmit antenna element to a first uplink signal path.

Method embodiment 2. The method of Method embodiment 1 wherein detecting (706) the TDD timing schedule includes: receiving (708) at least one of a system information broadcast (SIB) or a slot format indication (SFI) broadcast; and decoding (710) the received at least one of the SIB (system information broadcast) or SFI (slot format indication) broadcast to recover TDD timing information.

Method embodiment 2A. The method of Method embodiment 1, wherein detecting (706) the TDD timing schedule includes monitoring (712) for at least one gap in base station (BS) and user equipment (UE) transmissions; and determining (714) if uplink or downlink signals preceded said gap.

Method embodiment 2B. The method of Method embodiment 2A, further comprising: detecting (724) a transition from an uplink mode of operation to a downlink mode of operation when it is determined that uplink signals preceded a detected gap.

Method embodiment 2C. The method of Method embodiment 1 wherein detecting the TDD schedule includes receiving TDD schedule information communicated to the repeater in a side channel used to communicate TDD schedule information to said repeater.

Method embodiment 2D. The method of Method embodiment 2C wherein said side channel is different from communications channels used to provide system information to UE devices or to communicate user data to UE devices.

Method embodiment 3. The method of Method embodiment 2, further comprising: (e.g., uplink data case) when said TDD timing schedule indicates a change from a downlink mode of operation to an uplink mode of operation, setting (732) a first set of donor side antenna receiver weights to a first set of values which cause constructive signal cancelation when combining signals received from donor side receive antenna outputs of a donor side antenna.

Method embodiment 3A. The method of Method embodiment 3, wherein said first set of donor side antenna receiver weights is a set of weights, each weight including an amplitude component and a corresponding phase component; and wherein said first set of values differs from a second set of values used during said downlink mode of operation.

Method embodiment 3AA. The method of Method embodiment 3A, wherein the values differ in terms of phase components but not amplitude components.

Method embodiment 3AAA. The method of Method embodiment 3A, wherein the values differ in terms of amplitude components but not phase components.

Method embodiment 4. The method of Method embodiment 2, further comprising: when said TDD timing schedule indicates a change from a downlink mode of operation to an uplink mode of operation, further performing the step of: ii) decreasing (734) the gain of a donor side receiver amplifier.

Method embodiment 4A. The method of Method embodiment 4, wherein decreasing (734) the gain of the donor side receiver amplifier is implemented by decreasing a voltage supplied to the donor side receiver amplifier or by decreasing a bias current supplied to the donor side receiver amplifier.

Method embodiment 5. The method of Method embodiment 4, wherein decreasing (734) the gain of the donor side receive amplifier includes reducing (736) said the voltage supplied to the amplifier to a lower voltage than a voltage which is supplied during downlink mode operation.

Method embodiment 6. The method of Method embodiment 5, wherein said lower voltage is a non-zero voltage.

Method embodiment 7. The method of Method embodiment 5, wherein said lower voltage is a zero voltage.

Method embodiment 8 The method of Method embodiment 1, further comprising using (750) a beam which is narrower for donor side communications than service side communications.

Method embodiment 9. The method of Method embodiment 8 further comprising storing (704) a code book including uplink mode information including serving and nulling weights for a plurality of different antenna beam arrangements.

Method embodiment 10. The method of Method embodiment 1, further comprising: automatically select (738) which set of donor side antenna weights is to be used at a given time based on the TDD timing schedule.

Exemplary Numbered Apparatus Embodiments

Apparatus embodiment 1: A repeater (106 or 600 or 800) comprising: a memory (611 or 810); and a processor (601 or 802) coupled to said memory, the processor being configured to: detect (706) a time division duplex (TDD) timing schedule including a plurality of times at which a switch is made between uplink and downlink communication; and control (744) a donor side switch (T/R switch) (258 or 260 or 306 or 308) to change between a transmit position and a receive position based on the TDD timing schedule.

Apparatus embodiment 1A. The repeater (106 or 600 or 800) of Apparatus embodiment 1, wherein said switch (306 or 308) is a first transmit/receive switch that couples a first donor side antenna element (302 or 304) to a first uplink signal path or a first downlink signal path at a given time.

Apparatus embodiment 1B. The repeater (106 or 600 or 800) of Apparatus embodiment 1, wherein said switch (258 or 260) is a donor side uplink switch that couples a donor side transmit antenna element (262 or 264) to a first uplink signal path.

Apparatus embodiment 2. The repeater (106 or 600 or 802) of Apparatus embodiment 1 wherein the processor (601 or 802) is configured, as part of detecting (706) the TDD timing schedule, to: receive (708) at least one of a system information broadcast (SIB) or a slot format indication (SFI) broadcast; and decode (710) the received at least one of the SIB (system information broadcast) or SFI (slot format indication) broadcast to recover TDD timing information.

Apparatus embodiment 2A. The repeater (106 or 600 or 802) of Apparatus embodiment 1, wherein the processor (601 or 802) is further configured, as part of detecting (706) the TDD timing schedule to: monitor (712) for at least one gap in base station (BS) and user equipment (UE) transmissions; and determine (714) if uplink or downlink signals preceded said gap.

Apparatus embodiment 2B. The repeater (106 or 600 or 802) of Apparatus embodiment 2A, wherein the processor (601 or 802) is further configured to: detect (724) a transition from an uplink mode of operation to a downlink mode of operation when it is determined that uplink signals preceded a detected gap.

Apparatus embodiment 2C. The repeater of Apparatus embodiment 1 wherein the processor is further configured to detect the TDD TDD schedule by receiving information communicated to the repeater in a side channel used to communicate TDD schedule information.

Apparatus embodiment 2D. The method of Apparatus embodiment 2C wherein said side channel is different from communications channels used to provide system information to UE devices or to communicate user data to UE devices.

Apparatus embodiment 3. The repeater (106 or 600 or 802) of Apparatus embodiment 2, when said TDD timing schedule indicates a change from a downlink mode of operation to an uplink mode of operation, setting (732) a first set of donor side antenna receiver weights to a first set of values which cause constructive signal cancelation when combining signals received from donor side receive antenna outputs of a donor side antenna.

Apparatus embodiment 3A. The repeater (106 or 600 or 800) of Apparatus embodiment 3, wherein said first set of donor side antenna receiver weights is a set of weights stored in said memory (611 or 810), each weight including an amplitude component and a corresponding phase component; and wherein said first set of values differs from a second set of values used during said downlink mode of operation.

Apparatus embodiment 3AA. The repeater (106 or 600 or 800) of Apparatus embodiment 3A, wherein the values differ in terms of phase components but not amplitude components.

Apparatus embodiment 3AAA. The repeater (106 or 600 or 800) of Apparatus embodiment 3A, wherein the values differ in terms of amplitude components but not phase components.

Apparatus embodiment 4. The repeater (106 or 600 or 800) of Apparatus embodiment 2, further comprising: a donor side receiver amplifier (206 or 208 or 310 or 312); and when said TDD timing schedule indicates a change from a downlink mode of operation to an uplink mode of operation, the processor (601 or 802) being further configured to control the repeater (106 or 600 or 800) to: decrease (734) the gain of a donor side receiver amplifier (206 or 208 or 310 or 312).

Apparatus embodiment 4A. The repeater (106 or 600 or 800) of Apparatus embodiment 4, wherein decreasing (734) the gain of the donor side receiver amplifier is implemented by decreasing a voltage supplied to the donor side receiver amplifier or by decreasing a bias current supplied to the donor side receiver amplifier.).

Apparatus embodiment 5. The repeater (106 or 600 or 800) of Apparatus embodiment 4, wherein decreasing (734) the gain of the donor side receive amplifier includes reducing (736) said the voltage supplied to the amplifier to a lower voltage than a voltage which is supplied during downlink mode operation.

Apparatus embodiment 6. The repeater (106 or 600 or 800) of Apparatus embodiment 5, wherein said lower voltage is a non-zero voltage.

Apparatus embodiment 7. The repeater (106 or 600 or 800) of Apparatus embodiment 5, wherein said lower voltage is a zero voltage.

Apparatus embodiment 8 The repeater (106 or 600 or 800) of Apparatus embodiment 1, further comprising using (750) a beam which is narrower for donor side communications than service side communications.

Apparatus embodiment 9. The repeater (106 or 600 or 800) of Apparatus embodiment 8 further comprising: a code book (842 or 400 or 500) stored in said memory (611 or 810) including uplink mode information including serving and nulling weights for a plurality of different antenna beam arrangements.

Apparatus embodiment 10. The repeater of Apparatus embodiment 1, wherein the processor (601 or 802) is further configured to: automatically select which set of donor side antenna weights is to be used at a given time based on the TDD timing schedule.

In the present application base stations are to be understood as including access points while wireless terminals will be used to refer to devices which interact with base stations, e.g., UE devices which interact with access points, e.g., WiFi STAs (stations). Wireless terminals such as UEs can be, for example, cell phones, tablets, mobile or stationary customer premises equipment. A communications device can be either base stations or wireless terminals.

The techniques of various embodiments may be implemented using software, hardware and/or a combination of software and hardware. Various embodiments are directed to apparatus and/or systems, e.g., wireless communications systems, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device including a multi-element antenna array supporting beam forming, such as a cellular AP or Wifi AP, a wireless terminal, a UE device, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., access point, with a processor which includes a component corresponding to each of the steps of the various described methods performed by the device in which the processor is included. In some but not all embodiments a device, e.g., wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless communications device such as an access point. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a repeater comprising:
   storing, in a storage device, a first set of control values for controlling repeater operation during an uplink mode of operation and a second set of control values for controlling repeater operation during a downlink mode of operation, said first set of control values including a first donor receive gain (DRG) control value for controlling the gain of a donor side receiver amplifier during the uplink mode of operation, said second set of control values including a second DRG control value for controlling the gain of the donor side receiver amplifier during the downlink mode of operation, said first DRG control value for controlling the gain of the donor side receiver amplifier controlling the gain of the donor side receiver amplifier to have a lower gain than when the second DRG control value is used for controlling the gain of the donor side receiver amplifier;
   detecting a time division duplex (TDD) timing schedule including a plurality of times at which a switch is made between uplink and downlink communication;
   in response to said TDD timing schedule indicating a change from a downlink mode of operation to an uplink mode of operation, switching between using the second set of control values for controlling repeater operation to using the first set of control values for controlling repeater operation, said switch in control values:
   i) decreasing the gain of the donor side receiver amplifier; and
   ii) controlling a donor side switch to change from a receive position to a transmit position causing a signal to be transmitted from a donor side antenna.

2. The method of claim 1,
   wherein the first set of control values for controlling repeater operation during an uplink mode of operation further includes a first donor side transmit amplifier gain control value for controlling the gain of a donor side transmit amplifier during the uplink mode of operation,
   wherein the second set of control values for controlling repeater operation during a downlink mode of operation further includes a second donor side transmit amplifier gain control value for controlling the gain of the donor side transmit amplifier during the downlink mode of operation; and
   wherein decreasing the gain of the donor side receiver amplifier includes reducing a voltage supplied to the donor side receiver amplifier to a voltage which is lower than a voltage supplied during a downlink mode of operation.

3. The method of claim 2,
   wherein
   said switch in control values further includes: switching from using the second donor side transmit amplifier gain control value to the first donor side transmit amplifier gain control value to control the gain of a donor side transmit amplifier used to amplify a signal that was received by a service side antenna to produce said signal that is transmitted from the donor side antenna, said donor side transmit amplifier being a different amplifier than said donor side receiver amplifier.

4. The method of claim 2, wherein said voltage which is lower than a voltage supplied during a downlink mode of operation is a non-zero voltage.

5. The method of claim 2, wherein said voltage which is lower than a voltage supplied during a downlink mode of operation is a zero voltage.

6. The method of claim 1 wherein detecting the TDD timing schedule includes:
   receiving at least one of a system information broadcast (SIB) or a slot format indication (SFI) broadcast; and decoding the received at least one of the SIB (system information broadcast) or SFI broadcast to recover TDD timing information.

7. The method of claim 6,
wherein said donor side antenna from which said signal is transmitted faces a base station; and
wherein a service side antenna faces a user equipment device (UE).

8. The method of claim 1, further comprising using a beam which is narrower for donor side communications than service side communications.

9. The method of claim 8 further comprising storing a code book including uplink mode information including serving and nulling weights for a plurality of different antenna beam arrangements.

10. The method of claim 1, further comprising:
automatically selecting a set of donor side antenna weights is to be used at a given time based on the TDD timing schedule.

11. A repeater comprising:
a memory, said memory storing a first set of control values for controlling repeater operation during an uplink mode of operation and a second set of control values for controlling repeater operation during a downlink mode of operation, said first set of control values including a first doner receive gain (DRG) control value for controlling the gain of a first donor side receiver amplifier during the uplink mode of operation, said second set of control values including a second DRG control value for controlling the gain of the first donor side receiver amplifier during the downlink mode of operation, said first DRG control value for controlling the gain of the donor side receiver amplifier controlling the gain of the donor side receiver amplifier to have a lower gain than when the second DRG control value is used for controlling the gain of the donor side receiver amplifier; and
the donor side receiver amplifier;
a donor side switch;
a donor side antenna; and
a processor coupled to said memory, the processor being configured to:
  detect a time division duplex (TDD) timing schedule including a plurality of times at which a switch is made between uplink and downlink communication; and
  in response to said TDD timing schedule indicating a change from a downlink mode of operation to an uplink mode of operation, control the repeater to switch between using the second set of control values for controlling repeater operation to using the first set of control values for controlling repeater operation, said switch in control values:
    i) decreasing the gain of the donor side receiver amplifier;
    ii) controlling the donor side switch to change from a receive position to a transmit position causing a signal to be transmitted from the donor side antenna.

12. The repeater of claim 11 wherein the processor is configured, to control the repeater to:
reduce a voltage supplied to the donor side receive receiver amplifier to a voltage which is lower than a voltage supplied during a downlink mode of operation as part of decreasing the gain of the donor side receive receiver amplifier.

13. The repeater of claim 12, further comprising:
a service side antenna;
a donor side transmit amplifier; and
wherein said the processor is further configured to control the repeater to:
  amplify, using the donor side transmit amplifier, a signal that was received by the service side antenna to produce said signal that is transmitted from the donor side antenna, said donor side transmit amplifier being a different amplifier than said donor side receiver amplifier.

14. The repeater of claim 12, wherein said the processor is further configured to control the repeater to:
set, when said TDD timing schedule indicates a change from a downlink mode of operation to an uplink mode of operation, a first set of donor side antenna receiver weights to a first set of values which cause constructive signal cancelation when combining signals received from donor side receive antenna outputs of a donor side antenna.

15. The repeater of claim 12,
wherein said donor side antenna from which said signal is transmitted faces a base station; and
wherein said service side antenna faces a user equipment device (UE).

16. The repeater of claim 15, wherein said lower voltage is a non-zero voltage.

17. The repeater of claim 15, wherein said lower voltage is a zero voltage.

18. The repeater of claim 11, wherein said the processor is further configured to control the repeater to:
use a beam which is narrower for donor side communications than service side communications.

19. The repeater of claim 18 further comprising:
a code book stored in said memory including uplink mode information including serving and nulling weights for a plurality of different antenna beam arrangements.

20. The repeater of claim 11, wherein the processor is further configured to:
automatically select a set of donor side antenna weights is to be used at a given time based on the TDD timing schedule.

* * * * *